United States Patent
Du

(10) Patent No.: US 12,549,393 B2
(45) Date of Patent: Feb. 10, 2026

(54) CONSENSUS RESULT SYNCHRONIZATION ACROSS ALGORITHMS OF DIFFERENT FAULT TOLERANCE TYPES

(71) Applicant: Tencent Technology (Shenzhen) Company Limited, Guangdong (CN)

(72) Inventor: Zhichao Du, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 85 days.

(21) Appl. No.: 18/434,745

(22) Filed: Feb. 6, 2024

(65) Prior Publication Data

US 2024/0179019 A1  May 30, 2024

Related U.S. Application Data

(63) Continuation of application No. PCT/CN2023/085831, filed on Apr. 3, 2023.

(30) Foreign Application Priority Data

Jun. 2, 2022 (CN) .......................... 202210622140.7

(51) Int. Cl.
*H04L 9/00* (2022.01)

(52) U.S. Cl.
CPC ..................... *H04L 9/50* (2022.05)

(58) Field of Classification Search
CPC ....... H04L 9/50; H04L 9/3239; H04L 9/3247; H04L 9/32; H04L 67/1095; Y02D 10/00
See application file for complete search history.

(56) References Cited

U.S. PATENT DOCUMENTS

| | | | |
|---|---|---|---|
| 10,929,845 B2 * | 2/2021 | Li | G06Q 20/38215 |
| 11,424,938 B1 * | 8/2022 | Meehan | H04L 9/3263 |
| 2018/0351732 A1 * | 12/2018 | Wang | G06F 16/1805 |
| 2020/0120157 A1 * | 4/2020 | Xie | H04L 9/0643 |
| 2020/0192770 A1 * | 6/2020 | Walid | H04L 9/3247 |
| 2020/0250374 A1 * | 8/2020 | Huang | H04L 9/0637 |
| 2021/0012336 A1 * | 1/2021 | Zhuo | H04L 9/006 |
| 2021/0160314 A1 * | 5/2021 | Parvataneni | H04L 9/3239 |

(Continued)

FOREIGN PATENT DOCUMENTS

EP  3605947 A1 *  2/2020  ......... H04L 67/1097

*Primary Examiner* — Javier O Guzman
(74) *Attorney, Agent, or Firm* — ArentFox Schiff LLP

(57) ABSTRACT

A blockchain consensus method includes broadcasting consensus requests to at least two blockchain nodes executing consensus algorithms of different fault tolerance types in a blockchain network. The method further includes obtaining response messages from blockchain nodes in the blockchain network in response to the consensus requests, and counting a node quantity of blockchain nodes transmitting the response messages in a same consensus stage, the node quantity including a quantity of the at least two blockchain nodes executing the consensus algorithms of different fault tolerance types. The method further includes, when the node quantity satisfies a consensus condition of the first consensus algorithm and does not satisfy a consensus condition of the second consensus algorithm, synchronizing a consensus result of the first consensus algorithm with a blockchain node executing the second consensus algorithm such that the blockchain node executing the second consensus algorithm reaches a consensus.

20 Claims, 8 Drawing Sheets

(56) References Cited

U.S. PATENT DOCUMENTS

2021/0312438 A1* 10/2021 Li ................... G06Q 20/3827
2021/0328810 A1* 10/2021 Wang ................ H04L 63/0428
2021/0329093 A1* 10/2021 Zhan ................. H04L 9/0894
2022/0004536 A1* 1/2022 Liao ................. G06F 21/64

* cited by examiner

CONSENSUS RESULT SYNCHRONIZATION ACROSS ALGORITHMS OF DIFFERENT FAULT TOLERANCE TYPES

RELATED APPLICATIONS

This application is a continuation of International Application No. PCT/CN2023/085831, filed on Apr. 3, 2023, which claims priority to Chinese Patent Application No. 202210622140.7, entitled "BLOCKCHAIN CONSENSUS METHOD AND APPARATUS, MEDIUM, AND ELECTRONIC DEVICE" and filed on Jun. 2, 2022. The disclosures of the prior applications are hereby incorporated by reference in their entirety.

FIELD OF THE TECHNOLOGY

This disclosure relates to the field of blockchain technologies, including a blockchain consensus.

BACKGROUND OF THE DISCLOSURE

In a blockchain network including a plurality of blockchain nodes, to achieve a decentralized and trusted environment, all blockchain nodes generally need to execute a unified consensus algorithm to achieve consistent data synchronization between the nodes. However, it is difficult for the unified consensus algorithm to meet diverse system service requirements, and there is a problem of poor flexibility.

SUMMARY

This disclosure provides a blockchain consensus method, a blockchain consensus apparatus, a computer-readable medium, an electronic device, and a computer program product, aiming to improve flexibility of a blockchain consensus.

Other characteristics and advantages of this disclosure become apparent from the following detailed description, or may be learned in part through the practice of this disclosure.

In an aspect, a blockchain consensus method performed by a current blockchain node in a blockchain network includes broadcasting consensus requests to at least two blockchain nodes executing consensus algorithms of different fault tolerance types in the blockchain network. The consensus algorithms of different fault tolerance types include a first consensus algorithm and a second consensus algorithm. The method further includes obtaining response messages from blockchain nodes in the blockchain network in response to the consensus requests, and counting a node quantity of blockchain nodes transmitting the response messages in a same consensus stage. The node quantity includes a quantity of the at least two blockchain nodes executing the consensus algorithms of different fault tolerance types. The method further includes, when the node quantity satisfies a consensus condition of the first consensus algorithm and does not satisfy a consensus condition of the second consensus algorithm, reaching a consensus on a blockchain node executing the first consensus algorithm, and synchronizing a consensus result of the first consensus algorithm with a blockchain node executing the second consensus algorithm such that the blockchain node executing the second consensus algorithm reaches a consensus.

In an aspect, a blockchain consensus apparatus includes processing circuitry configured to broadcast consensus requests to at least two blockchain nodes executing consensus algorithms of different fault tolerance types in a blockchain network. The consensus algorithms of different fault tolerance types include a first consensus algorithm and a second consensus algorithm. The processing circuitry is further configured to obtain response messages from blockchain nodes in the blockchain network in response to the consensus requests, and count a node quantity of blockchain nodes transmitting the response messages in a same consensus stage. The node quantity includes a quantity of the at least two blockchain nodes executing the consensus algorithms of different fault tolerance types. The processing circuitry is further configured to, when the node quantity satisfies a consensus condition of the first consensus algorithm and does not satisfy a consensus condition of the second consensus algorithm, reach a consensus on a blockchain node executing the first consensus algorithm, and synchronize a consensus result of the first consensus algorithm with a blockchain node executing the second consensus algorithm such that the blockchain node executing the second consensus algorithm reaches a consensus.

In an aspect, a non-transitory computer-readable storage medium stores computer-readable instructions thereon, which, when executed by processing circuitry, cause the processing circuitry to perform a blockchain consensus method including broadcasting consensus requests to at least two blockchain nodes executing consensus algorithms of different fault tolerance types in a blockchain network. The consensus algorithms of different fault tolerance types includes a first consensus algorithm and a second consensus algorithm. The method further includes obtaining response messages from blockchain nodes in the blockchain network in response to the consensus requests. The method further includes counting a node quantity of blockchain nodes transmitting the response messages in a same consensus stage, the node quantity comprising a quantity of the at least two blockchain nodes executing the consensus algorithms of different fault tolerance types. The method further includes, when the node quantity satisfies a consensus condition of the first consensus algorithm and does not satisfy a consensus condition of the second consensus algorithm, reaching a consensus on a blockchain node executing the first consensus algorithm, and synchronizing a consensus result of the first consensus algorithm with a blockchain node executing the second consensus algorithm such that the blockchain node executing the second consensus algorithm reaches a consensus.

In the technical solution provided in the aspects of this disclosure, by configuring at least two blockchain nodes executing consensus algorithms of different types in a blockchain network, a node quantity of blockchain nodes transmitting consensus responses may be counted in a process of performing a node consensus, and when the node quantity satisfies a consensus condition of any one of the consensus algorithms, a consensus result may be synchronized by a blockchain node that satisfies the consensus condition with a blockchain node that does not satisfy the consensus condition, thereby improving flexibility of a blockchain consensus.

It is to be understood that the foregoing general description and the following detailed description are merely for exemplary and explanatory purposes, and cannot limit this disclosure.

DETAILED DESCRIPTION

Figure 1:
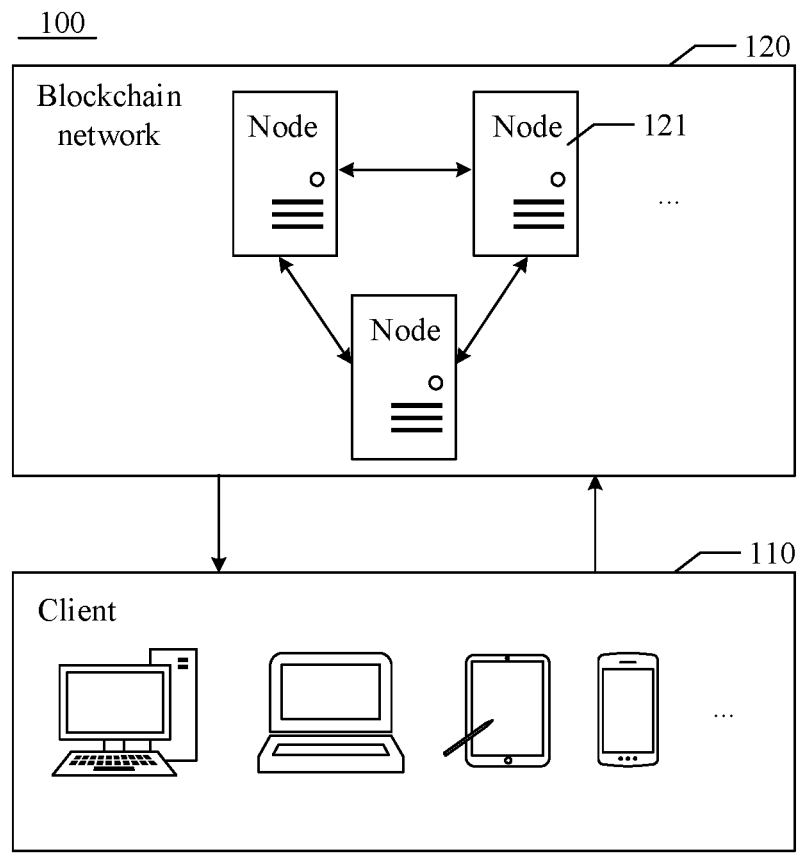
FIG. 1 is a schematic diagram of a composition of a blockchain system according to an aspect of this disclosure.

Now, exemplary implementations are described with reference to the accompanying drawings. However, the examples of implementations may be implemented in various forms, and it should not be understood as being limited to the examples described herein. Conversely, the implementations are provided to convey the idea of the examples of the implementations to a person skilled in the art.

In addition, the described features, structures, or characteristics may be combined in one or more aspects in any appropriate manner. In the following description, a lot of specific details are provided to give a full understanding of the aspects of this disclosure. However, a person skilled in the art is to be aware of that, the technical solution in this disclosure may be implemented without one or more of the particular details, or other methods, unit, apparatus, or step may be adopted. In other cases, well-known methods, apparatuses, implementations, or operations are not shown or described in detail, to avoid obscuring the aspects of this disclosure.

The block diagrams shown in the accompanying drawings is merely a functional entity and does not necessarily correspond to a physically independent entity. To be specific, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely examples for descriptions, do not necessarily include all content and operations/steps, and are not necessarily performed in the described orders. For example, some operations/steps may be further divided, while some operations/steps may be combined or partially combined. Therefore, an actual execution order may vary depending on an actual situation.

In a specific implementation of this disclosure, related data such as a request, a response, and the like that are generated when a user uses a blockchain product is involved. When each aspect of this disclosure is applied to a specific product or technology, user permission or consent is required to be obtained, and relevant collection, use, and processing of data are required to comply with relevant laws, regulations, and standards of relevant countries and regions.

A blockchain is an anti-counterfeiting, tamper-proof, and traceable shared digital ledger with a chained-block data structure and built through a transparent and trustworthy rule in a peer-to-peer network environment. The chained-block data structure is a data structure that stores a transaction that occurs within a period of time in a unit of a block, and uses a cryptographic algorithm to connect blocks into a chain in chronological order. A ledger is distributed to all member nodes in a network, permanently recording a history of an asset transaction that have occurred between peer nodes in the network in a sequential chain of blocks linked by using a hash cryptographic algorithm. All confirmed and verified transactions are linked from a beginning of a chain all the way to a latest block, hence comes the name blockchain. The blockchain may act as a single source of truth, and members of a blockchain network can only view transactions relevant to the members.

FIG. 1 is a schematic diagram of a composition of a blockchain system according to an aspect of this disclosure. A blockchain system 100 may include at least one client 110 and a blockchain network 120, and the blockchain network 120 includes at least one blockchain node 121. The client 110 may be an electronic device such as a smartphone, a tablet computer, a notebook computer, a desktop computer, a smart wearable device, a smart in-vehicle device, a smart payment terminal, or a facial recognition terminal. By installing a corresponding client application, a blockchain data service may be provided for a user. The blockchain node 121 may be a terminal device or a server. For example, the blockchain node 121 may be an independent physical server, or may be a server cluster including a plurality of physical servers, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

In the blockchain network 120, each blockchain node 121 may receive input information during normal operating, and maintain shared data in the blockchain network based on the received input information. To ensure information exchange, there may be information connections among all the blockchain nodes 121, and the blockchain nodes 121 may transmit information through the information connections. For example, when any blockchain node 121 in the blockchain network 120 receives the input information and broadcasts the input information in the blockchain network 120, another node in the blockchain network 120 may obtain the input information according to a consensus algorithm, and store the input information as shared data.

The blockchain nodes 121 in the blockchain network 120 all have corresponding node identifiers, and the blockchain nodes 121 in the blockchain network 120 all may store node identifiers of other blockchain nodes in the same blockchain network, to subsequently broadcast a generated block to the other nodes in the blockchain network 120 according to the node identifiers of the other blockchain nodes. Each blockchain node 121 may maintain a node identifier list shown in table 1, and a node name and a node identifier are correspondingly stored in the node identifier list. The node identifier may be an internet protocol (IP) address and any other type of information that can identify the node. Table 1 is a node identifier list using the IP address as an example.

TABLE 1

| Node name | Node identifier |
|---|---|
| Node 1 | 117. 114. 151. 174 |
| Node 2 | 117. 116. 189. 145 |
| . . . | . . . |
| Node N | 119. 123. 145. 223 |

Figure 2:
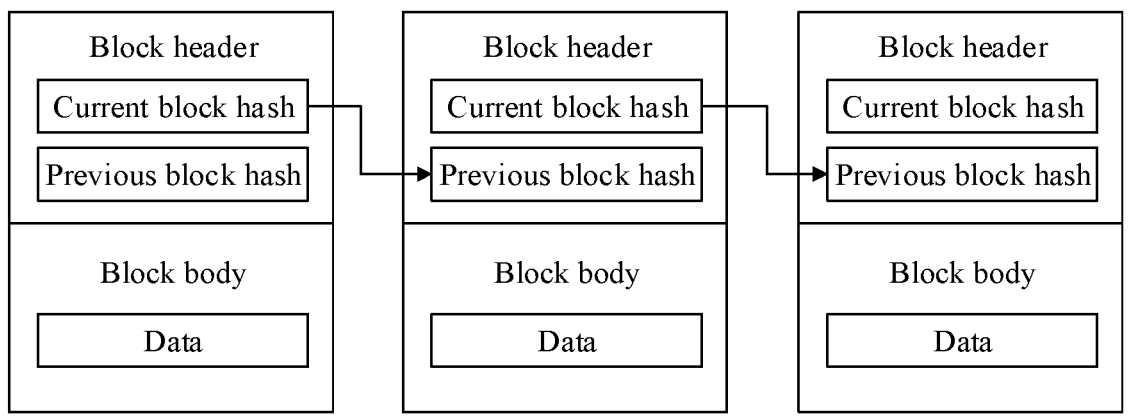
FIG. 2 shows a composition structure of a blockchain maintained in a blockchain network.

FIG. 2 shows a composition structure of a blockchain maintained in a blockchain network. As shown in FIG. 2, the blockchain includes a plurality of sequentially connected blocks. Whenever there is new data that needs to be written to the blockchain, the data is to be summarized into a newly generated block, and the newly generated block is to be linked to an end of the blockchain. Through a consensus algorithm, that blocks newly added on each node device 121 are exactly the same may be ensured. Data of a current block is recorded in a block body of each block, and a hash of a previous block connected to the block is saved in a block header of the block. If transaction data in the previous block changes, a hash of the current block also changes accordingly. Therefore, data uploaded to the blockchain network is difficult to be tampered with, which may improve reliability of shared data.

Figure 3:
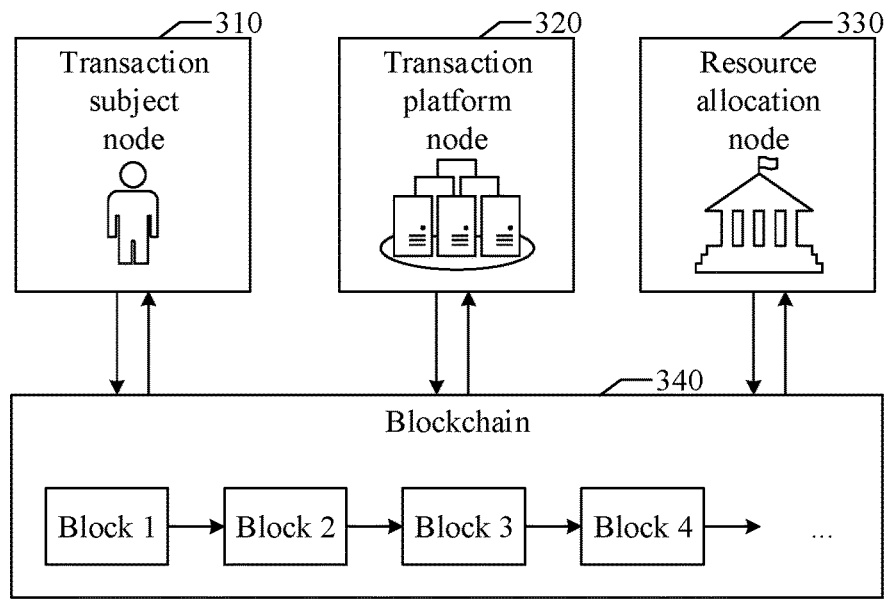
FIG. 3 exemplarily shows a network architecture of a blockchain network to which a technical solution of this disclosure is applied.

FIG. 3 exemplarily shows a network architecture of a blockchain network to which a technical solution of this disclosure is applied. As shown in FIG. 3, in an application scenario of achieving a network transaction and a network payment, a transaction subject node 310, a transaction platform node 320, and a resource allocation node 330 that are located in the blockchain network jointly maintain one or more blockchains 340.

The transaction subject node 310 is a blockchain node that provides a transaction service for a user, and may be, for example, a merchant or an individual seller who performs a network transaction with the user.

The transaction platform node 320 is a blockchain node that provides a transaction scenario for a network transaction, and may be, for example, an e-commerce website, an online mall, or a service platform that provides a network transaction service.

The resource allocation node 330 is a blockchain node that provides a fund management and allocation service for a network transaction, and may be, for example, a third-party payment institution.

When performing the network transaction with the transaction subject node 310, the user may pay a transaction fund to the transaction subject node 310 through an account opened on the resource allocation node 330. The transaction platform node 320, as a provider of the transaction scenario, needs to extract a certain amount of the transaction fund to be used as a platform service fee. To implement credible fund allocation between the transaction subject node 310 and the transaction platform node 320, a corresponding smart contract (for example, a ledger contract) for fund allocation may be concluded based on the blockchain network. When the network transaction occurs, the resource allocation node 330 may allocate a fund to each object in the transaction scenario according to the smart contract. Transaction data generated by the network transaction on each blockchain node may be uploaded and saved through the blockchain 340, and decentralized data saving may effectively avoid a crisis of trust.

Due to an error such as node downtime, a network failure, a software error, or a malicious node, data saved between the blockchain nodes may be inconsistent. The consensus algorithm defines a set of distributed algorithms for network interaction between nodes, ensuring that in a system environment where the foregoing error occurs, consistency of data between the blockchain nodes may still be ensured. In a related technology of this disclosure, all blockchain nodes in a blockchain network need to use a unified consensus algorithm for consensus authentication, to ensure consistency of a consensus process and a consensus result. However, in an actual blockchain service processing process, an upper-layer service system using a blockchain service continues to change with a user requirement, and has different demands in terms of performance, availability, fault tolerance, scalability, and the like. However, in a current blockchain network, a single consensus algorithm is used and a requirement of the upper-layer service system cannot be matched. If the consensus algorithm of the blockchain node needs to be changed on the blockchain network, the entire blockchain network must be controlled to stop a service. After algorithms of all the blockchain nodes are changed, a blockchain network configured with a new consensus algorithm is re-enabled. This manner of switching the consensus algorithm may easily lead to a long-term and high-frequency service interruption. Not only efficiency of consensus algorithm switching is low, but service continuity and stability reliability of the blockchain network is seriously affected.

For the foregoing technical problem existing in the related technology, this disclosure provides a solution in which a plurality of consensus algorithms of different types can be flexibly switched online, allowing the blockchain system to change, without stopping the service, the consensus algorithm in real time to meet a requirement of a service system.

Technical solutions such as a blockchain consensus method, a blockchain consensus apparatus, a computer-readable medium, an electronic device, and a computer program product that are provided in this disclosure are described in detail below with reference to specific implementations.

Figure 4:
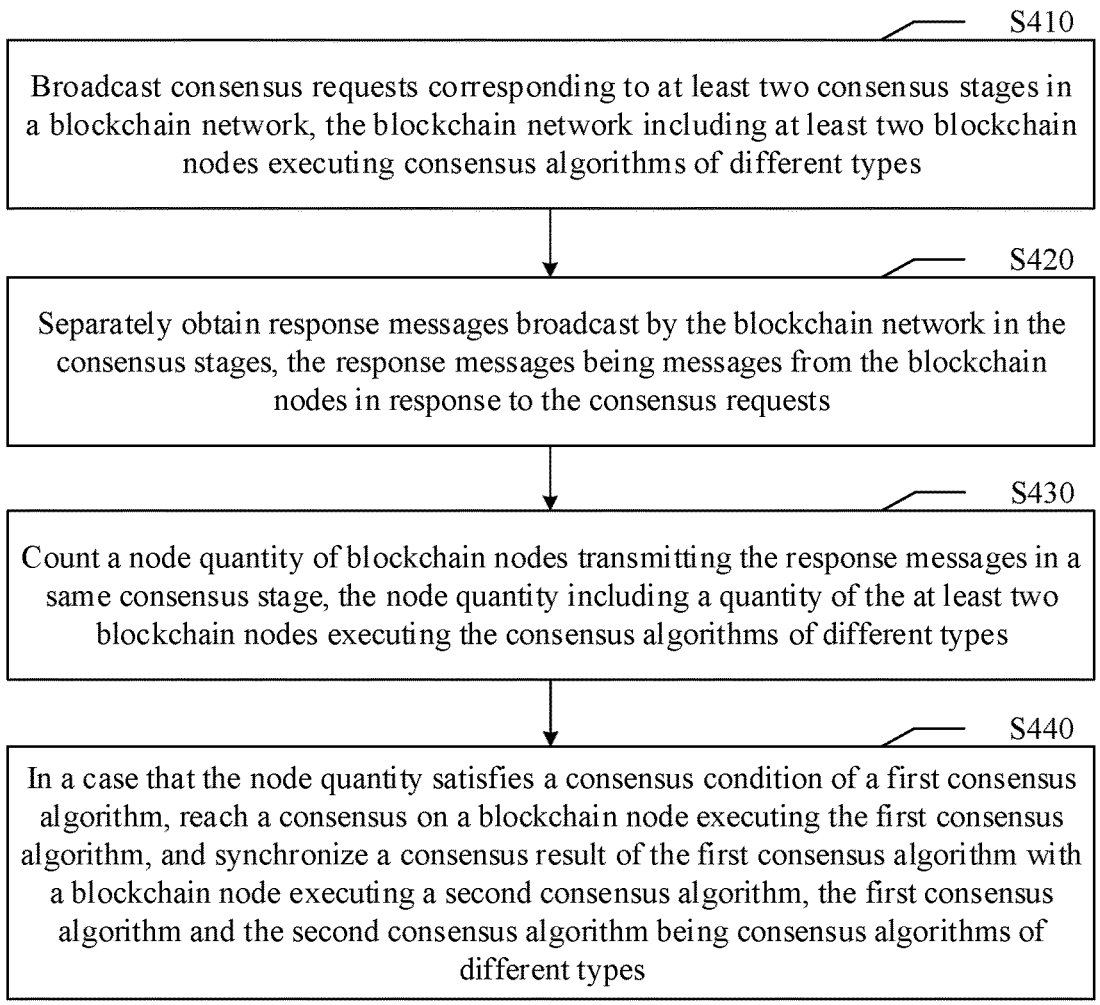
FIG. 4 is a flowchart of steps of a blockchain consensus method according to an aspect of this disclosure.

FIG. 4 is a flowchart of steps of a blockchain consensus method according to an aspect of this disclosure. The blockchain consensus method may be performed by the client or the blockchain node shown in FIG. 1. For case of description, any blockchain node in a blockchain network is used as a current blockchain node, and the current blockchain node is used as an execution subject for executing this aspect of this disclosure. The current blockchain node may be configured with the client shown in FIG. 1. In other words, in this aspect of this disclosure, the blockchain consensus method performed on the current blockchain node is used as an example for description. As shown in FIG. 4, the blockchain consensus method in this aspect of this disclosure includes the following S410 to S440.

S410: Broadcast consensus requests corresponding to at least two consensus stages in a blockchain network, the blockchain network including at least two blockchain nodes executing consensus algorithms of different types. For example, consensus requests are broadcast to at least two blockchain nodes executing consensus algorithms of different fault tolerance types in a blockchain network. The consensus algorithms of different fault tolerance types include a first consensus algorithm and a second consensus algorithm.

The blockchain network in this aspect of this disclosure may include any one of a public block chain, a private block chain, or a consortium block chain. A most decentralized one is the public block chain. A node/participant joining the public block chain may read data on the chain, publish a transaction, and compete for an accounting right of a new block, and the like. In addition, each node/participant may freely join and exit the public block chain. The private block chain is on the contrary. An accounting right of the private block chain is controlled by a specified organization or institution, and a data reading right is also controlled by the organization or institution. There are few participants and the participants cannot join the private block chain at will, and need to be reviewed by the organization or institution. The consortium block chain, also referred to as a community blockchain, is a blockchain whose consensus process is controlled by a pre-selected node, is a mixture of the public block chain and the private block chain, and may implement "partial decentralization". Generally, there is a corresponding entity or organization for each node on the chain. Participants join the network through authorization and form a consortium of stakeholders to jointly maintain operation of the blockchain. Through the consortium block chain, new participants may join an already formed blockchain and share data without having to build the blockchain from scratch. Whether it is the public block chain, the private block chain, or the consortium block chain, a function of a smart contract may be provided. A smart contract on the blockchain is a contract that may be triggered by a transaction on a blockchain system. The smart contract may be defined in a form of code.

The smart contract, also referred to as chaincode or application code, is a computer protocol designed to spread, verify, or execute a contract in an information-based manner, is a program deployed in a node of the blockchain network, carries service logic for executing a transaction, and runs in an isolated operating environment (for example, a container or a virtual machine). A contract program automatically executed by each node in the blockchain system according to a specific condition may operate data stored on the chain. This is an important way for a service entity to interact with the blockchain and use the blockchain to implement service logic. An objective of the smart contract is to provide a security method superior to a related contract, and reduce other transaction costs related to the contact. The smart contract allows trusted transactions to be performed without a third party, and these transactions are traceable and irreversible.

Consensus authentication needs to be performed, between different blockchain nodes through the consensus algorithm, on transaction data generated based on the smart contract, to ensure that consistent transaction data may be saved on each blockchain node. In an aspect of this disclosure, after a user conducts a network transaction through a client running the blockchain system and generates transaction data, the client may transmit a consensus request to a blockchain node that communicates with the client. The blockchain node that receives the consensus request may broadcast the consensus request on the blockchain network so that the consensus request can be transmitted to all blockchain nodes in the blockchain network.

In this aspect of this disclosure, at least two consensus algorithms of different types may be simultaneously run on the blockchain network. For example, a part of blockchain nodes in the blockchain network execute a first consensus algorithm, and another part of the blockchain nodes execute a second consensus algorithm different from the first consensus algorithm. The first consensus algorithm and the second consensus algorithm may have a same consensus condition, or may have different consensus conditions. The first consensus algorithm and the second consensus algorithm may include consensus stages of a same quantity or consensus stages of different quantities.

In an aspect of this disclosure, one or more blockchain nodes may be selected from the blockchain network to be used as master nodes for processing a consensus request, and another blockchain node other than the master node in the blockchain network is used as a slave node. When the client generates the consensus request, the consensus request may be first transmitted to the master node, and the master node delivers the consensus request to each slave node. The master node may be generated through voting, rotational designation, or random selection.

S420: Separately obtain response messages broadcast by the blockchain network in the consensus stages, the response messages being messages from the blockchain nodes in response to the consensus requests. For example, response messages are obtained from blockchain nodes in the blockchain network in response to the consensus requests.

After receiving the consensus requests, the blockchain nodes in the blockchain network may respond to the consensus requests, generate the response messages, and broadcast the response messages on the blockchain network.

In an aspect of this disclosure, the blockchain nodes may perform consensus verification on the received consensus requests, and broadcast and transmit the response messages on the blockchain network after verification is passed. The consensus verification performed by the blockchain node on the consensus request may include two aspects: signature verification and data verification. The signature verification is for verifying reliability of a source of the consensus request, and the data verification is for verifying authenticity of content of the consensus request.

In an aspect of this disclosure, the consensus request broadcast in the blockchain network carries a digital signature of a blockchain node that transmits the consensus request, and the response message broadcast in the blockchain network also carries a digital signature of a blockchain node that transmits the response message. Each blockchain node in the blockchain network may hold a public key and a private key that form an asymmetric key pair. When digital signature is performed on the consensus request or the response message, content digest may be extracted from data content by using a digest extraction algorithm. The content digest is then encrypted by using the private key to form a digital signature, and the digital signature may be verified by using the public key.

A content digest is a fixed-length string that uniquely corresponds to a piece of data content, and is generated by applying a one-way hash encryption function to the data content. If the data content is tampered with during network transmission, whether the data content has changed may be determined by comparing content digest of the data content before transmission and content digest of the data content after transmission. Therefore, integrity of the data content can be verified based on the content digest. For the content digest, plaintext of to-be-transmitted data content is mapped into a string of ciphertext by using a one-way hash function. The string of ciphertext is also referred to as a digital fingerprint. The content digest has a fixed length, and results of summarizing different plaintext into ciphertext are always different, while digests of same plaintext must be consistent. The digest extraction algorithm in this aspect of this disclosure may include, for example, a message digest (MD) algorithm, a secure hash algorithm (SHA), a message authentication code (MAC) algorithm, or the like.

The digital signature is a message digest algorithm with a key. The key includes a public key and a private key. The key is configured to verify data integrity, authenticate a data source, and resist repudiation, and follows an OSI reference model, private key signature, and public key verification. The digital signature is also a combination of an asymmetric encryption algorithm and a message digest algorithm. Common digital signature algorithms mainly include a rivest-shamir-adleman (RSA) algorithm, a digital signature algorithm (DSA), and an elliptic curve digital signature algorithm (ECDSA).

Based on the RSA algorithm, a pair of RSA keys may be generated first, one of which is a secret key saved by a service entity; and the other is a public key, which may be disclosed to an outside world and may even be registered in a network server. To improve confidentiality, an RSA key must be at least 500 bits long, and 1024 bits is generally recommended. This makes a huge computation amount for encryption. To reduce the computation amount, when transmitting information, a combination of a related encryption method and a public key encryption method is often used. In other words, the information is encrypted by using an improved DES or IDEA session key, and then the session key and information digest are encrypted by using an RSA key. After the other party receives the information, decryption is performed by using different keys and the information digest may be checked.

An important feature of the DSA is disclosure of two prime numbers. In this way, when other subjects p and q are used, even if a private key is not known, whether the subjects were generated randomly or were generated through forgery or modification can be confirmed.

The ECDSA is a combination of elliptic curves cryptography (ECC) and the DSA. An entire signature process is similar to that of the DSA. A difference is that an algorithm used in signature is the ECC. A final signed value is also divided into two parameters: r and s.

In an aspect of this disclosure, after the signature verification performed on the consensus request is completed, data verification may be performed on the data content carried in the consensus request. A method of the data verification may include, for example, performing consistency check between the data content carried in the consensus request and data content locally cached by the current blockchain node. If the verification passes, it indicates that the blockchain node that transmits the consensus request caches the same data content as the current blockchain node, and the data content is not modified during network transmission.

S430: Count a node quantity of blockchain nodes transmitting the response messages in a same consensus stage, the node quantity including a quantity of the at least two blockchain nodes executing the consensus algorithms of different types. For example, a node quantity of blockchain nodes transmitting the response messages in a same consensus stage is counted. The node quantity includes a quantity of the at least two blockchain nodes executing the consensus algorithms of different fault tolerance types.

After receiving the response message broadcast and transmitted in the blockchain network, the blockchain node may determine a message source of each response message by parsing the response message. By counting the response messages with different message sources, the node quantity of the blockchain nodes transmitting the response messages may be obtained. The node quantity represents a quantity of blockchain nodes executing consensus algorithms of different types in response to the consensus requests in the blockchain network.

In an aspect of this disclosure, each blockchain node may receive and count response messages transmitted from other blockchain nodes. For example, if the blockchain network includes n blockchain nodes, each blockchain node may receive at most n−1 response messages transmitted by other blockchain nodes. In addition, each blockchain node itself also transmits a response message to the outside world. Therefore, a maximum node quantity of the blockchain nodes transmitting the response messages and counted by a blockchain node is a total quantity of blockchain nodes in the blockchain network. Message source statistics is performed by each blockchain node, which may improve credibility of the consensus process.

In an aspect of this disclosure, one or more master nodes in the blockchain network may perform source statistics on the response messages, while other slave nodes do not need to perform source statistics. For example, in a consensus process, the master node is generated through voting, rotational designation, or random selection. After transmitting a consensus request to the blockchain network, the master node may monitor a response message returned from the slave node in the blockchain network, and count a node quantity of slave nodes transmitting response messages. An advantage of performing message source statistics through the master node is that computing cost of other slave nodes may be reduced and unnecessary data overhead is avoided.

In an aspect of this disclosure, to improve consensus efficiency, the node quantity of the blockchain nodes transmitting response messages may be counted within a preset time range. If a new response message is received beyond the time range, the new response message may be discarded without being counted.

In an aspect of this disclosure, the time range for counting the node quantity may be a fixed time window with a specified time length based on a first time point when the current blockchain node receives the consensus request as a start point of the range, or may be a fixed time window with a specified time length based on a second time point when the current blockchain node transmits the response message as a start point of the range.

In an aspect of this disclosure, the time range for counting the node quantity may be a dynamic time window with a varying length in which an end point of the range is determined based on a third time point when a latest response message is received and a preset time length. For example, if a last time a blockchain node receives a response message is a time point A, based on a time length B, an end point of the time range may be determined to be A+B. If the blockchain node does not receive a new response message between time points A to A+B, source statistics performed on the response message may be stopped. If the blockchain node receives a new response message between time points A to A+B, for example, if a new response message is received at a time point C, the end point of the time range may be updated to C+B. By analogy, until the blockchain node does not receive a new response message for a long time, source statistics performed on the response message may be stopped.

In an aspect of this disclosure, the time range for performing source statistics on the response message may be a time range with a static start point and a dynamic end point.

For example, any time point when a consensus request is received, a response message is transmitted, or a response message is received for the first time is used as the static start point, and the dynamic end point is determined based on a latest new response message received and a preset time length. Using a dynamically changing time range for source statistics can improve statistical efficiency while ensuring accuracy of data statistics, avoiding affecting a consensus progress due to a too long time range, and avoiding inaccurate data statistics caused by a too short time range.

S440: In a case that the node quantity satisfies a consensus condition of the first consensus algorithm, reach a consensus on a blockchain node executing the first consensus algorithm, and synchronize a consensus result of the first consensus algorithm with a blockchain node executing the second consensus algorithm, the first consensus algorithm and the second consensus algorithm being consensus algorithms of different types. For example, when the node quantity satisfies a consensus condition of the first consensus algorithm and does not satisfy a consensus condition of the second consensus algorithm, a consensus on a blockchain node executing the first consensus algorithm is reached, and a consensus result of the first consensus algorithm is synchronized with a blockchain node executing the second consensus algorithm such that the blockchain node executing the second consensus algorithm reaches a consensus.

The consensus condition of the consensus algorithm is a determination condition for determining whether the consensus result can be obtained. For example, the consensus condition of a consensus algorithm may be that a counted node quantity of blockchain nodes transmitting response messages exceeds a preset ratio of a total quantity of blockchain nodes. The consensus algorithms of different types configured in the blockchain network may have a same consensus condition, or may have different consensus conditions.

In an aspect of this disclosure, the blockchain node in the blockchain network may determine whether the counted node quantity satisfies the consensus condition based on the consensus algorithm executed by the blockchain node. For example, if a consensus algorithm executed by a current blockchain node is the first consensus algorithm, whether the consensus condition of the first consensus algorithm is satisfied may be determined based on the counted node quantity; and if the consensus algorithm executed by the current blockchain node is the second consensus algorithm, whether a consensus condition of the second consensus algorithm is satisfied may be determined based on the counted node quantity.

In an aspect of this disclosure, a part of blockchain nodes in the blockchain network execute the first consensus algorithm, and another part of the blockchain nodes execute the second consensus algorithm. The consensus condition of the first consensus algorithm is that a ratio of a counted node quantity of the blockchain nodes transmitting the response messages to a total quantity of blockchain nodes is greater than a first ratio threshold, the consensus condition of the second consensus algorithm is that the ratio of the counted node quantity of the blockchain nodes transmitting the response messages to the total quantity of blockchain nodes is greater than a second ratio threshold, and the second ratio threshold is greater than the first ratio threshold. If the ratio of the counted node quantity to the total quantity of blockchain nodes is greater than the first ratio threshold, but less than the second ratio threshold, it may be determined that the node quantity satisfies the consensus condition of the first consensus algorithm and does not satisfy the consensus condition of the second consensus algorithm. Based on this, the blockchain node executing the first consensus algorithm can obtain a consensus result of a successful consensus. Although the blockchain node executing the second consensus algorithm fails to achieve a successful consensus, the blockchain node executing the first consensus algorithm may perform data synchronization with the blockchain node executing the second consensus algorithm, so that the blockchain node executing the second consensus algorithm can also complete a consensus.

In the blockchain consensus method provided in this aspect of this disclosure, by configuring at least two blockchain nodes executing consensus algorithms of different types in a blockchain network, a node quantity of blockchain nodes transmitting consensus response messages may be counted in a process of performing a node consensus, and when the node quantity satisfies a consensus condition of any one of the consensus algorithms, a consensus result may be synchronized by a blockchain node that satisfies the consensus condition with a blockchain node that does not satisfy the consensus condition, thereby improving flexibility of a blockchain consensus.

In an aspect of this disclosure, the consensus algorithms of different types include consensus stages of different quantities, each response message carries an algorithm type and a node signature that are of the blockchain node, the algorithm type indicates a consensus algorithm executed by the blockchain node, and the node signature includes a digital signature of the blockchain node in each consensus stage.

Figure 5:
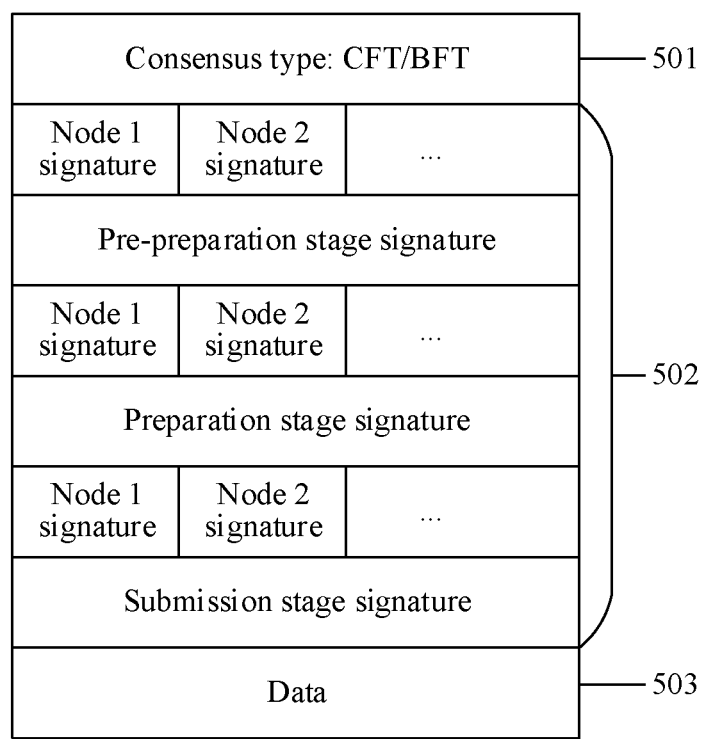
FIG. 5 shows a data structure of a response message according to an aspect of this disclosure.

FIG. 5 shows a data structure of a response message according to an aspect of this disclosure. As shown in FIG. 5, a response message generated based on a specified consensus algorithm may include a type field 501, a signature field 502, and a data field 503.

The type field 501 indicates an algorithm type of a consensus algorithm executed by a blockchain node that transmits the response message, which may include, for example, a CFT consensus algorithm or a BFT consensus algorithm.

The CFT consensus algorithm, namely a crash fault tolerance (CFT) algorithm, is a type of consensus algorithm that can ensure consistency of node data when facing a fault-type error. The fault-type error includes a benign error such as node downtime or a network error.

The BFT consensus algorithm, namely a Byzantine fault tolerance (BFT) algorithm, is a type of consensus algorithm that can ensure consistency of node data when facing a Byzantine-type error. The Byzantine-type error includes the foregoing fault-type error, and a malignant error such as a software error or a malicious node.

The signature field 502 is for saving a digital signature of the blockchain node transmitting the response message in each consensus stage. The digital signature may include, for example, a pre-preparation stage signature, a preparation stage signature, and a submission stage signature.

When generating the response message, the blockchain node executing the CFT consensus algorithm may use the pre-preparation stage signature and the submission stage signature in the data structure; and when generating the response message, the blockchain node executing the BFT consensus algorithm may use signatures of three stages.

In an aspect of this disclosure, a response message of a stage carries digital signatures of all previous stages. For example, a response message of a first stage carries a digital signature of the first stage, a response message of a second stage simultaneously carries digital signatures that are of the first stage and the second stage, and a response message of a third stage simultaneously carries digital signatures that are of the first stage, the second stage, and the third stage.

The data field 503 is for saving data of requesting consensus authentication, and may be, for example, transaction data of a network transaction.

The data structure of the response message provided in this aspect of this disclosure is applicable to a plurality of consensus algorithms of different types, so that consensus algorithms with consensus stages of different quantities can perform consensus authentication through a same response message, and a matching diversity of the blockchain network for different consensus algorithms is improved.

Figure 6:
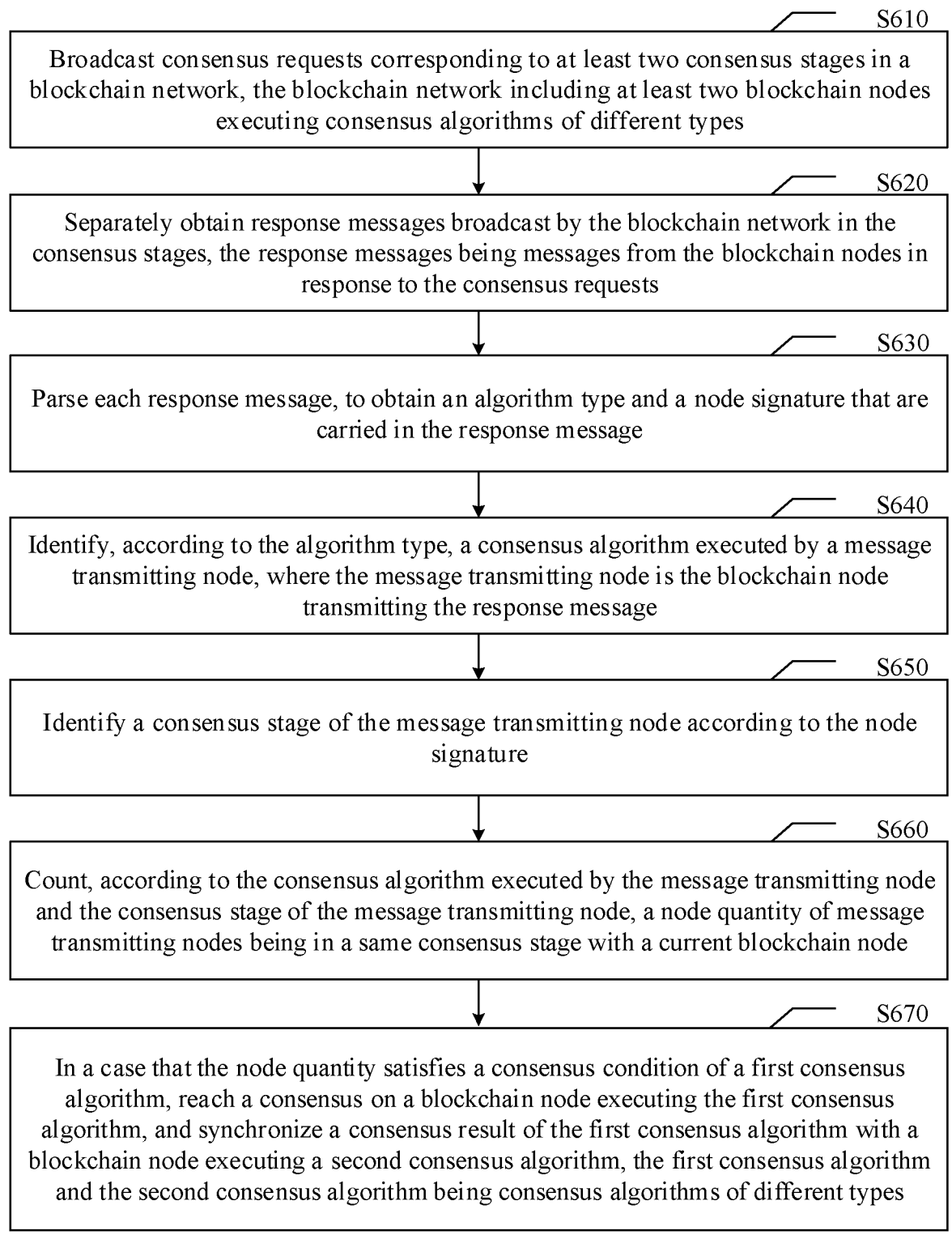
FIG. 6 shows a blockchain consensus method in which a node quantity is counted based on a consensus stage according to an aspect of this disclosure.

For the consensus algorithms with consensus stages of different quantities, because each blockchain node in the blockchain network has a specified difference in computing power and network transmission speed, in a process of performing consensus authentication, a consensus stage of each blockchain node may also be different. Therefore, when a previous blockchain node receives a response message transmitted by another blockchain node, a corresponding consensus stage needs to be identified based on the response message, to effectively count a node quantity of blockchain nodes in different consensus stages. FIG. 6 shows a blockchain consensus method in which a node quantity is counted based on a consensus stage according to an aspect of this disclosure. As shown in FIG. 6, the method includes the following S610 to S670.

S610: Broadcast consensus requests corresponding to at least two consensus stages in a blockchain network, the blockchain network including at least two blockchain nodes executing consensus algorithms of different types.

In this aspect of this disclosure, at least two consensus algorithms of different types may be simultaneously run on the blockchain network. For example, a part of blockchain nodes in the blockchain network execute a first consensus algorithm, and another part of the blockchain nodes execute a second consensus algorithm different from the first consensus algorithm. The first consensus algorithm and the second consensus algorithm may have a same consensus condition, or may have different consensus conditions.

In an aspect of this disclosure, one or more blockchain nodes may be selected from the blockchain network to be used as master nodes for processing a consensus request, and another blockchain node other than the master node in the blockchain network is used as a slave node. When a client generates the consensus request, the consensus request may be first transmitted to the master node, and the master node delivers the consensus request to each slave node. The master node may be generated through voting, rotational designation, or random selection.

S620: Separately obtain response messages broadcast by the blockchain network in the consensus stages, the response messages being messages from the blockchain nodes in response to the consensus requests.

After receiving the consensus requests, the blockchain nodes in the blockchain network may respond to the consensus requests, generate the response messages, and broadcast the response messages on the blockchain network.

In an aspect of this disclosure, the blockchain nodes may perform consensus verification on the received consensus requests, and broadcast and transmit the response messages on the blockchain network after verification is passed. The consensus verification performed by the blockchain node on the consensus request may include two aspects: signature verification and data verification. The signature verification is for verifying reliability of a source of the consensus request, and the data verification is for verifying authenticity of content of the consensus request.

In an aspect of this disclosure, the consensus request broadcast in the blockchain network carries a digital signature of a blockchain node that transmits the consensus request, and the response message broadcast in the blockchain network also carries a digital signature of a blockchain node that transmits the response message. Each blockchain node in the blockchain network may hold a public key and a private key that form an asymmetric key pair. When digital signature is performed on the consensus request or the response message, content digest may be extracted from data content by using a digest extraction algorithm. The content digest is then encrypted by using the private key to form a digital signature, and the digital signature may be verified by using the public key.

In an aspect of this disclosure, after the signature verification performed on the consensus request is completed, data verification may be performed on the data content carried in the consensus request. A method of the data verification may include, for example, performing consistency check between the data content carried in the consensus request and data content locally cached by the current blockchain node. If the verification passes, it indicates that the blockchain node that transmits the consensus request caches the same data content as the current blockchain node, and the data content is not modified during network transmission.

S630: Parse each response message, to obtain an algorithm type and a node signature that are carried in the response message.

Each response message carries an algorithm type and a node signature that are of the blockchain node, the algorithm type indicates a consensus algorithm executed by the blockchain node, and the node signature includes a digital signature of the blockchain node in each consensus stage.

The data structure shown in FIG. 6 may be obtained by parsing the response message, the algorithm type may be obtained based on the type field, and the node signature corresponding to each consensus stage may be obtained based on the signature field.

S640: Identify, according to the algorithm type, a consensus algorithm executed by a message transmitting node, where the message transmitting node is the blockchain node transmitting the response message The blockchain nodes in the blockchain network all have corresponding node identifiers, and the blockchain nodes in the blockchain network all may store node identifiers of other blockchain nodes in the blockchain network, to subsequently broadcast data such as a generated consensus request, a response message, and a block to be uploaded to the chain to the other blockchain nodes in the blockchain network according to the node identifiers of the other blockchain nodes. Each blockchain node may maintain a node identifier list, and a node name and a node identifier are correspondingly stored in the node identifier list. The node identifier may be an internet protocol (IP) address and any other information that can identify the blockchain node.

When a blockchain node broadcasts and transmits a response message in the blockchain network, a node identifier of the blockchain node may be encapsulated in the response message. When a current blockchain node receives the response message broadcast on the blockchain network, a message transmitting node transmitting the response message may be determined based on the node identifier parsed in the response message. A consensus algorithm executed by the message transmitting node may be determined based on an algorithm type parsed in the response message.

S650: Identify a consensus stage of the message transmitting node according to the node signature.

By parsing the response message, the signature field thereof may be read to obtain the node signature corresponding to each consensus stage. Because each blockchain node may have differences in a consensus progress, the response messages broadcast on the blockchain network may also carry node signatures corresponding to different consensus stages. For example, if a specified blockchain node is in a pre-preparation stage, a response message transmitted by the blockchain node is to carry a node signature of the pre-preparation stage. For another example, if a specified blockchain node has completed consensus authentication of a pre-preparation stage and is currently in a preparation stage, a response message transmitted by the blockchain node is to carry node signatures of two parts: the pre-preparation stage and the preparation stage.

In an aspect of this disclosure, by parsing the response message, one or more consensus stages in which the node signature exists may be filtered. According to an execution order of the consensus stages, a current consensus stage of the message transmitting node may be determined.

If there is a node signature in only one consensus stage in the signature field, the message transmitting node may be determined to be in the consensus stage. For example, if there is a node signature in only a pre-preparation stage in a signature field of a response message, and a signature field corresponding to another consensus stage is empty, a message transmitting node transmitting the response message may be determined to be currently in the pre-preparation stage.

If there are node signatures in at least two consensus stages in the signature field, a consensus stage with a later execution order may be determined as a current consensus stage of the message transmitting node based on an execution order of the at least two consensus stages. For example, if there are node signatures in both a pre-preparation stage and a preparation stage in a signature field of a response message, and a signature field corresponding to another consensus stage is empty, because the preparation stage in a consensus algorithm is executed after the pre-preparation stage, the message transmitting node of the response message may be determined to be currently in the preparation stage.

S660: Count, according to the consensus algorithm executed by the message transmitting node and the consensus stage of the message transmitting node, a node quantity of message transmitting nodes being in a same consensus stage with a current blockchain node.

Based on the consensus algorithm executed by the message transmitting node, whether the message transmitting node and the current blockchain node execute consensus algorithms of a same type may be determined. In a case that the message transmitting node and the current blockchain node execute consensus algorithms of a same type, whether the message transmitting node and the current blockchain node are in a same consensus stage may be determined directly based on a consensus stage of the message transmitting node. In a case that the message transmitting node and the current blockchain node execute consensus algorithms of different types, whether a consensus stage of the message transmitting node is the same as that of the current blockchain node needs to be determined according to a pre-configured matching relationship.

Before counting a node quantity of message transmitting nodes being in a same consensus stage with the current blockchain node, the current blockchain node may first obtain a matching relationship of consensus stages between the consensus algorithms of different types. In a case that the message transmitting node and the current blockchain node execute the consensus algorithms of different types, the message transmitting node being in the same consensus stage with the current blockchain node is determined according to the matching relationship.

For any two consensus algorithms of different types, whether the blockchain nodes are in a same consensus stage may be determined based on the matching relationship. For example, the message transmitting node executes one of the first consensus algorithm and the second consensus algorithm, and the current blockchain node executes the other one of the first consensus algorithm and the second consensus algorithm. The first consensus algorithm includes N consensus stages, and the second consensus algorithm includes M consensus stages; and the matching relationship between the consensus stages of the consensus algorithms of different types includes: first P consensus stages of the first consensus algorithm and first P consensus stages of the second consensus algorithm match each other, and P is a smaller value of N−1 and M−1; and last N-P consensus stages of the first consensus algorithm and last M-P consensus stages of the second consensus algorithm match each other.

For example, the first consensus algorithm is a CFT consensus algorithm, and includes two consensus stages, namely, a preparation stage and a submission stage; and the second consensus algorithm is a BFT consensus algorithm, and includes three consensus stages, namely, a pre-preparation stage, a preparation stage, and a submission stage.

Based on the foregoing matching relationship, it may be learned that a previous consensus stage of the first consensus algorithm and a previous consensus stage of the second consensus algorithm match each other. In other words, the preparation stage of the CFT consensus algorithm and the pre-preparation stage of the BFT consensus algorithm match each other. A latter consensus stage of the first consensus algorithm and latter two consensus stages of the second consensus algorithm match each other. In other words, the submission stage of the CFT consensus algorithm and the preparation stage and the submission stage that are of the BFT consensus algorithm match each other.

Based on this, if a blockchain node is in the preparation stage of the CFT consensus algorithm, and another blockchain node is in the pre-preparation stage of the BFT consensus algorithm, the two blockchain nodes may be determined to be in a same consensus stage. Similarly, if a blockchain node is in the submission stage of the CFT consensus algorithm, and another blockchain node is in the preparation stage or the submission stage of the BFT consensus algorithm, the two blockchain nodes may be determined to be in a same consensus stage.

In an aspect of this disclosure, after counting the node quantity of the message transmitting nodes being in the same consensus stage with the current blockchain node, the current blockchain node may determine a subsequent algorithm execution action based on a consensus stage of the current blockchain node. In a case that the consensus stage of the current blockchain node is a last consensus stage of an executed consensus algorithm, a consensus result of the consensus algorithm is determined based on whether the node quantity satisfies a consensus condition of the consensus algorithm; and in a case that the consensus stage of the current blockchain node is not a last consensus stage of an executed consensus algorithm, based on whether the node quantity satisfies a consensus condition of the consensus algorithm, whether to execute a next consensus stage of the consensus algorithm is determined.

For example, the consensus stage of the current blockchain node is the preparation stage of the CFT consensus algorithm. Through counting a node quantity of blockchain nodes being in a same consensus stage (including the preparation stage of the CFT consensus algorithm or the pre-preparation stage of the BFT consensus algorithm) with the current blockchain node, whether the node quantity satisfies the consensus condition of the CFT consensus algorithm may be determined. If the consensus condition of the CFT consensus algorithm is satisfied, the submission stage may be entered; and if the consensus condition of the CFT consensus algorithm is not satisfied, a response message transmitted from another blockchain node needs to be waited continuously, and a counted node quantity is updated in real time.

In an aspect of this disclosure, each blockchain node may receive and count response messages transmitted from other blockchain nodes. For example, if the blockchain network includes n blockchain nodes, each blockchain node may receive at most n−1 response messages transmitted by other blockchain nodes. In addition, each blockchain node itself also transmits a response message to the outside world. Therefore, a maximum node quantity of the blockchain nodes transmitting the response messages and counted by a blockchain node is a total quantity of blockchain nodes in the blockchain network. Message source statistics is performed by each blockchain node, which may improve credibility of the consensus process.

In an aspect of this disclosure, one or more master nodes in the blockchain network may perform source statistics on the response messages, while other slave nodes do not need to perform quantity statistics. For example, in a consensus process, the master node is generated through voting, rotational designation, or random selection. After transmitting a consensus request to the blockchain network, the master node may monitor a response message returned from the slave node in the blockchain network, and count a node quantity of slave nodes transmitting response messages. An advantage of performing message source statistics through the master node is that computing cost of other slave nodes may be reduced and unnecessary data overhead is avoided.

In an aspect of this disclosure, to improve consensus efficiency, the node quantity of the blockchain nodes transmitting response messages may be counted within a preset time range. If a new response message is received beyond the time range, the new response message may be discarded without being counted.

In an aspect of this disclosure, the time range for counting the node quantity may be a fixed time window with a specified time length based on a first time point when the current blockchain node receives the consensus request as a start point of the range, or may be a fixed time window with a specified time length based on a second time point when the current blockchain node transmits the response message as a start point of the range.

In an aspect of this disclosure, the time range for counting the node quantity may be a dynamic time window with a varying length in which an end point of the range is determined based on a third time point when a latest response message is received and a preset time length. For example, if a last time a blockchain node receives a response message is a time point A, based on a time length B, an end point of the time range may be determined to be A+B. If the blockchain node does not receive a new response message between time points A to A+B, source statistics performed on the response message may be stopped. If the blockchain node receives a new response message between time points A to A+B, for example, if a new response message is received at a time point C, the end point of the time range may be updated to C+B. By analogy, until the blockchain node does not receive a new response message for a long time, source statistics performed on the response message may be stopped.

In an aspect of this disclosure, the time range for performing source statistics on the response message may be a time range with a static start point and a dynamic end point. For example, any time point when a consensus request is received, a response message is transmitted, or a response message is received for the first time is used as the static start point, and the dynamic end point is determined based on a latest new response message received and a preset time length. Using a dynamically changing time range for source statistics can improve statistical efficiency while ensuring accuracy of data statistics, avoiding affecting a consensus progress due to a too long time range, and avoiding inaccurate data statistics caused by a too short time range.

S670: In a case that the node quantity satisfies a consensus condition of the first consensus algorithm, reach a consensus on a blockchain node executing the first consensus algorithm, and synchronize a consensus result of the first consensus algorithm with a blockchain node executing the second consensus algorithm, the first consensus algorithm and the second consensus algorithm being consensus algorithms of different types.

The consensus condition of the consensus algorithm is a determination condition for determining whether the consensus result can be obtained. For example, the consensus condition of a consensus algorithm may be that a counted node quantity of blockchain nodes transmitting response messages exceeds a preset ratio of a total quantity of blockchain nodes. The consensus algorithms of different types configured in the blockchain network may have a same consensus condition, or may have different consensus conditions.

In an aspect of this disclosure, the blockchain node in the blockchain network may determine whether the counted node quantity satisfies the consensus condition based on the consensus algorithm executed by the blockchain node. For example, if a consensus algorithm executed by a current blockchain node is the first consensus algorithm, whether the consensus condition of the first consensus algorithm is satisfied may be determined based on the counted node quantity; and if the consensus algorithm executed by the current blockchain node is the second consensus algorithm, whether a consensus condition of the second consensus algorithm is satisfied may be determined based on the counted node quantity.

In an aspect of this disclosure, a part of blockchain nodes in the blockchain network execute the first consensus algorithm, and another part of the blockchain nodes execute the second consensus algorithm. The consensus condition of the first consensus algorithm is that a ratio of a counted node quantity of the blockchain nodes transmitting the response messages to a total quantity of blockchain nodes is greater than a first ratio threshold, the consensus condition of the second consensus algorithm is that the ratio of the counted node quantity of the blockchain nodes transmitting the response messages to the total quantity of blockchain nodes is greater than a second ratio threshold, and the second ratio threshold is greater than the first ratio threshold. If the ratio of the counted node quantity to the total quantity of blockchain nodes is greater than the first ratio threshold, but less than the second ratio threshold, it may be determined that the node quantity satisfies the consensus condition of the first consensus algorithm and does not satisfy the consensus condition of the second consensus algorithm. Based on this, the blockchain node executing the first consensus algorithm can obtain a consensus result of a successful consensus. Although the blockchain node executing the second consensus algorithm fails to achieve a successful consensus, the blockchain node executing the first consensus algorithm may perform data synchronization with the blockchain node executing the second consensus algorithm, so that the blockchain node executing the second consensus algorithm can also complete a consensus.

In an aspect of this disclosure, the first consensus algorithm is one of a low fault tolerance consensus algorithm and a high fault tolerance consensus algorithm, and the second consensus algorithm is one of the low fault tolerance consensus algorithm and the high fault tolerance consensus algorithm that is different from the first consensus algorithm. A consensus condition of the low fault tolerance consensus algorithm is that a quantity ratio of the blockchain nodes transmitting the response messages to all blockchain nodes is greater than a first ratio threshold, a consensus condition of the high fault tolerance consensus algorithm is that the quantity ratio of the blockchain nodes transmitting the response messages to all blockchain nodes is greater than a second ratio threshold, and the first ratio threshold is less than the second ratio threshold. Each of the first ratio threshold and the second ratio threshold is a constant greater than 0 and less than 1. For example, the first ratio threshold is ½, and the second ratio threshold is ⅔.

If the quantity ratio of the blockchain nodes transmitting the response messages to all blockchain nodes is less than ½, the node quantity neither satisfies the consensus condition of the low fault tolerance consensus algorithm nor the consensus condition of the high fault tolerance consensus algorithm, and all blockchain nodes executing the two consensus algorithms cannot complete consensus authentication.

If the quantity ratio of the blockchain nodes transmitting the response messages to all blockchain nodes is greater than ½ but less than ⅔, the node quantity satisfies the consensus condition of the low fault tolerance consensus algorithm but does not satisfy the consensus condition of the high fault tolerance consensus algorithm, and a blockchain node executing the low fault tolerance consensus algorithm can complete consensus authentication, while a blockchain node executing the high fault tolerance consensus algorithm cannot complete consensus authentication. On this basis, the blockchain node executing the low fault tolerance consensus algorithm may synchronize a consensus result with the blockchain node executing the high fault tolerance consensus algorithm, thereby enabling all blockchain nodes in the blockchain network to complete consensus authentication.

If the quantity ratio of the blockchain nodes transmitting the response messages to all blockchain nodes is greater than ⅔, the node quantity satisfies both the consensus condition of the low fault tolerance consensus algorithm and the consensus condition of the high fault tolerance consensus algorithm, and all blockchain nodes executing the two consensus algorithms can complete consensus authentication.

In an aspect of this disclosure, the low fault tolerance consensus algorithm includes consensus stages of a first quantity, the high fault tolerance consensus algorithm includes consensus stages of a second quantity, and the first quantity is less than the second quantity. Fault tolerance of the consensus algorithm may be improved by increasing a quantity of consensus stages.

In an aspect of this disclosure, the consensus stage of the low fault tolerance consensus algorithm includes a preparation stage and a submission stage that are executed in sequence, the consensus stage of the high fault tolerance consensus algorithm includes a pre-preparation stage, a preparation stage, and a submission stage that are executed in sequence, the preparation stage of the low fault tolerance consensus algorithm matches the pre-preparation stage of the high fault tolerance consensus algorithm, and the submission stage of the low fault tolerance consensus algorithm matches the preparation stage and the submission stage that are of the high fault tolerance consensus algorithm.

Figure 7:
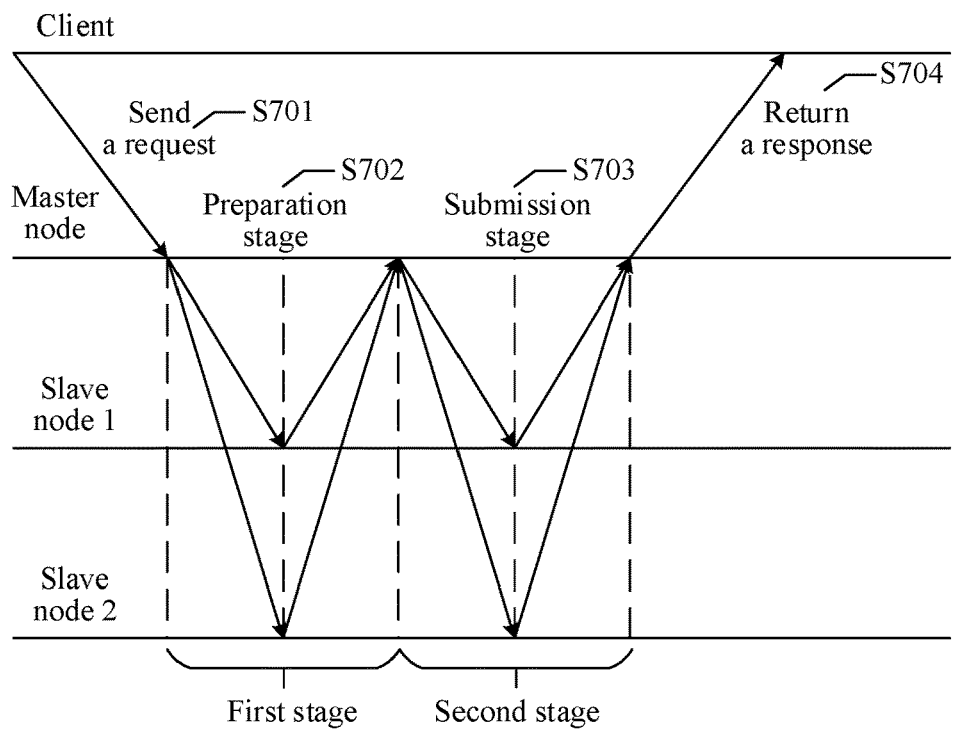
FIG. 7 shows a consensus process of a low fault tolerance consensus algorithm according to an aspect of this disclosure.

FIG. 7 shows a consensus process of a low fault tolerance consensus algorithm according to an aspect of this disclosure. The low fault tolerance consensus algorithm may be, for example, a Paxos algorithm in a CFT consensus algorithm. The low fault tolerance consensus algorithm in this aspect of this disclosure is based on interaction between nodes of two stages. An advantage is that the interaction between nodes is simple, so that implementation is easy and performance is high.

As shown in FIG. 7, a process of performing consensus authentication based on the low fault tolerance consensus algorithm may include the following steps.

S701: A client transmits a consensus request to a master node. The consensus request may be, for example, a write-data request for writing data to a blockchain.

S702: The master node performs first-stage node interaction (preparation stage) and distributes an authentication request to another slave node. After receiving the authentication request and performing consensus processing, the slave node may return a response message to the master node.

In a preparation stage, the authentication request transmitted by the master node to another slave node carries data that needs to be written to the blockchain, and a digital signature that is of the master node and is obtained after the data is digested and encrypted by using a private key of the master node. By using the data structure shown in FIG. 5 as an example, the authentication request transmitted by the master node to the slave node carries the digital signature of the master node written in a field "pre-preparation stage signature".

When the slave node receives the authentication request transmitted by the master node, signature verification may be performed, by using a public key of the master node, on the digital signature carried in the authentication request. After the signature verification is passed, the slave node may digest and encrypt, by using a private key of the slave node, the data that needs to be written to the blockchain to obtain a digital signature of the slave node. By using the data structure shown in FIG. 5 as an example, the response message returned by the slave node to the master node in the preparation stage carries the digital signature of the master node written in the field "pre-preparation stage signature" and the digital signature of the slave node.

S703: When the master node receives response messages that exceed ½ of a total quantity of nodes (including the master node itself), the master node executes a second stage (a submission stage), and the master node submits data and notifies another slave node to submit data. After receiving the notification, the slave node may write data to a blockchain saved by the slave node itself, and return a response message to the master node.

When receiving the response message returned by the slave node in the preparation stage, the master node may collect and aggregate a digital signature of the slave node carried in each response message.

After entering the submission stage, the master node may transmit a submission notification carrying an aggregated digital signature to each slave node. By using the data structure shown in FIG. 5 as an example, the submission notification transmitted by the master node to the slave node carries the digital signature of the master node written in the field "pre-preparation stage signature" and a plurality of digital signatures of the slave nodes, and additionally carries a digital signature of the master node written in a field "submission stage signature". A quantity of digital signatures of the master nodes and the digital signatures of the slave nodes in the field "pre-pre-preparation stage signature" should exceed ½ of the total quantity of nodes. In other words, a consensus condition of a low fault tolerance consensus algorithm in the preparation stage is satisfied.

When receiving the submission notification transmitted by the master node, the slave node may perform signature verification in a manner the same as that in a previous stage, and write the digital signature of the slave node itself in the response message after the verification is passed. By using the data structure shown in FIG. 5 as an example, the response message returned by the slave node to the master node in the submission stage carries the digital signature of the master node written in the field "pre-preparation stage signature" and the plurality of digital signatures of the slave nodes, and additionally carries the digital signature of the master node written in the field "submission stage signature" and the digital signature of the slave node itself.

S704: The master node returns a response to the client indicating that the data has been written successfully. In this case, the client may determine that the data has been successfully written into an entire blockchain system.

When receiving the response message returned by the slave node in the submission stage, the master node may collect and aggregate a digital signature of the slave node carried in each response message. By using the data structure shown in FIG. 5 as an example, the response message returned by the master node to the client carries the digital signature of the master node written in a field "pre-preparation stage signature" and a plurality of digital signatures of the slave nodes, and additionally carries a digital signature of the master node written in a field "submission stage signature" and a plurality of digital signatures of the slave nodes. A quantity of digital signatures of the master nodes and the digital signatures of the slave nodes in the field "pre-preparation stage signature" should exceed ½ of the total quantity of nodes, and a quantity of digital signatures of the master nodes and the digital signatures of the slave nodes in the field "submission stage signature" should exceed ½ of the total quantity of nodes. In other words, a consensus condition of a low fault tolerance consensus algorithm in the preparation stage and the submission stage is satisfied.

Figure 8:
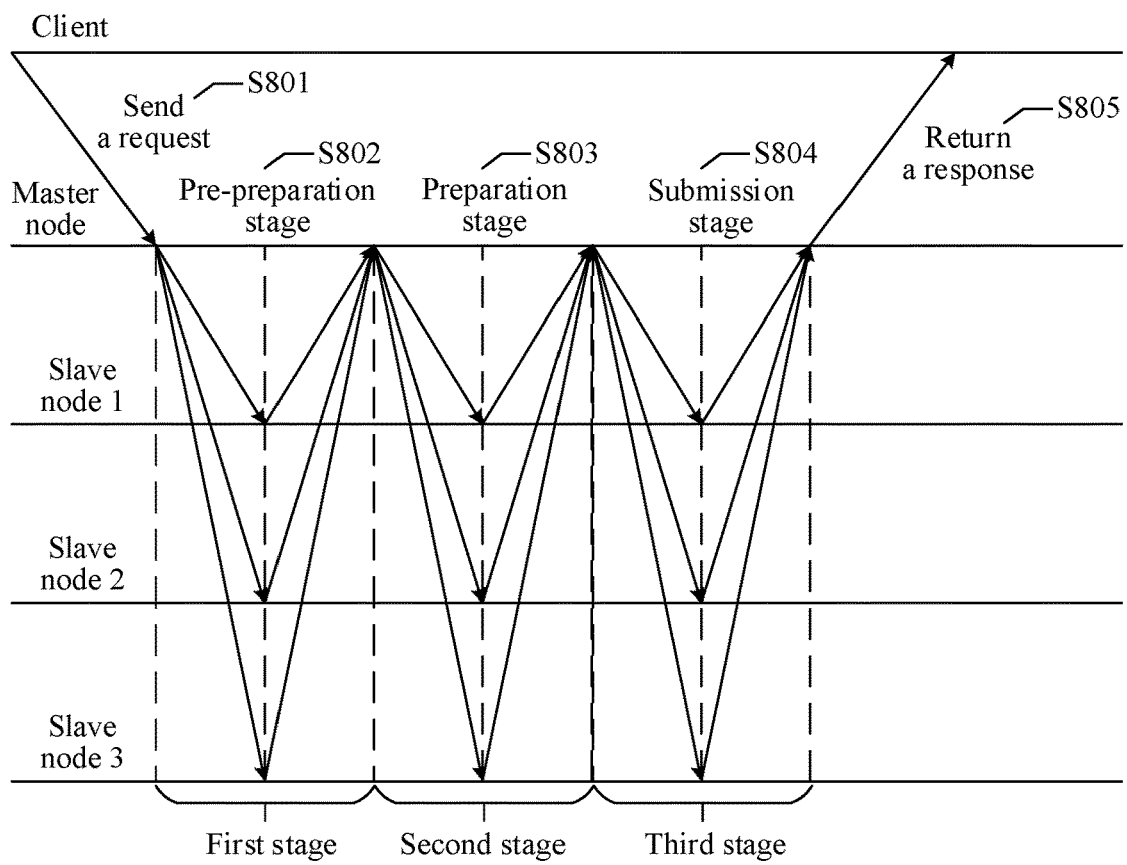
FIG. 8 shows a consensus process of a high fault tolerance consensus algorithm according to an aspect of this disclosure.

FIG. 8 shows a consensus process of a high fault tolerance consensus algorithm according to an aspect of this disclosure. The high fault tolerance consensus algorithm may be, for example, a PBFT algorithm in a BFT consensus algorithm. Compared with a CFT consensus algorithm, the BFT consensus algorithm needs to ensure consistency of a system even in a case of a software error or a node misbehavior. Therefore, node interaction of the BFT algorithm is more complex and generally requires three stages of interaction; and a quantity of fault tolerance nodes is smaller, and generally ⅓ of faulty nodes may be tolerated.

As shown in FIG. 8, a process of performing consensus authentication based on the high fault tolerance consensus algorithm may include the following steps.

S801: A client transmits a consensus request to a master node. The consensus request may be, for example, a write-data request for writing data to a blockchain.

S802: The master node performs first-stage node interaction (pre-preparation stage) and distributes an authentication request to another slave node. After receiving the authentication request and performing consensus processing, the slave node may return a response message to the master node. An objective of this stage is to confirm that requests received by a plurality of slave nodes are the same, to prevent the master node from having malicious behavior and transmitting different messages to different slave nodes.

In the pre-preparation stage, the authentication request transmitted by the master node to another slave node carries data that needs to be written to the blockchain, and a digital signature that is of the master node and is obtained after the data is digested and encrypted by using a private key of the master node. By using the data structure shown in FIG. 5 as an example, the authentication request transmitted by the master node to the slave node carries the digital signature of the master node written in a field "pre-preparation stage signature".

After the slave node receives the authentication request transmitted by the master node, signature verification may be performed, by using a public key of the master node, on the digital signature carried in the authentication request. After the signature verification is passed, the slave node may digest and encrypt, by using a private key of the slave node, the data that needs to be written to the blockchain to obtain a digital signature of the slave node. By using the data structure shown in FIG. 5 as an example, the response message returned by the slave node to the master node in the pre-preparation stage carries the digital signature of the master node written in the field "pre-preparation stage signature" and the digital signature of the slave node.

S803: When the master node receives response messages, in the pre-preparation stage, that exceed ⅔ of a total quantity of nodes (including the master node itself), the master node executes a second stage (a preparation stage), and the master node re-transmits a message signature to another slave node. The slave node is to verify whether a quantity of message signatures is greater than ⅔ of the total quantity of nodes. If the quantity of message signatures is greater than ⅔, the slave node returns a response message indicating successful voting to the master node.

When receiving the response message returned by the slave node in the pre-preparation stage, the master node may collect and aggregate a digital signature of the slave node carried in each response message.

After entering the preparation stage, the master node may transmit a preparation message carrying an aggregated digital signature to each slave node. By using the data structure shown in FIG. 5 as an example, the preparation message transmitted by the master node to the slave node carries the digital signature of the master node written in the field "pre-preparation stage signature" and a plurality of digital signatures of the slave nodes, and additionally carries a digital signature of the master node written in a field "preparation stage signature". A quantity of digital signatures of the master nodes and the digital signatures of the slave nodes in the field "pre-pre-preparation stage signature" should exceed ⅔ of the total quantity of nodes. In other words, a consensus condition of a high fault tolerance consensus algorithm in the pre-preparation stage is satisfied.

After receiving the preparation message transmitted by the master node, the slave node may perform signature verification in a manner the same as that in a previous stage, and write the digital signature of the slave node itself in the response message after the verification is passed. By using the data structure shown in FIG. 5 as an example, the response message returned by the slave node to the master node in the preparation stage carries the digital signature of the master node written in the field "pre-preparation stage signature" and the plurality of digital signatures of the slave nodes, and additionally carries the digital signature of the master node written in the field "submission stage signature" and the digital signature of the slave node itself.

S804: When the master node receives response messages that exceed ⅔ of a total quantity of nodes (including the master node itself), the master node executes a third stage (a submission stage), and the master node submits data and notifies another slave node to submit data. After receiving the notification, the slave node may write data to a blockchain saved by the slave node itself, and return a response message to the master node.

When receiving the response message returned by the slave node in the preparation stage, the master node may collect and aggregate a digital signature of the slave node carried in each response message.

After entering the submission stage, the master node may transmit a submission notification carrying an aggregated digital signature to each slave node. By using the data structure shown in FIG. 5 as an example, the submission notification transmitted by the master node to the slave node carries the digital signature of the master node written in the field "pre-preparation stage signature" and a plurality of digital signatures of the slave nodes, and additionally carries a digital signature of the master node written in a field "preparation stage signature" and a plurality of digital signatures of the slave nodes, and a digital signature of the master node written in a field "submission stage signature". A quantity of digital signatures of the master nodes and the digital signatures of the slave nodes in the field "pre-preparation stage signature" should exceed ⅔ of the total quantity of nodes, and a quantity of digital signatures of the master nodes and the digital signatures of the slave nodes in the field "preparation stage signature" should exceed ⅔ of the total quantity of nodes. In other words, a consensus condition of a high fault tolerance consensus algorithm in the pre-preparation stage and the preparation stage is satisfied.

When receiving the preparation message transmitted by the master node, the slave node may perform signature verification in a manner the same as that in a previous stage, and write the digital signature of the slave node itself in the response message after the verification is passed. By using the data structure shown in FIG. 5 as an example, the response message returned by the slave node to the master node in the submission stage carries the digital signature of the master node written in the field "pre-preparation stage signature" and the plurality of digital signatures of the slave nodes, and additionally carries the digital signature of the master node written in the field "preparation stage signature" and the plurality of digital signatures of the slave nodes, and the digital signature of the master node written in the field "submission stage signature" and the digital signature of the slave node itself.

S805: The master node returns a response to the client indicating that the data has been written successfully. In this case, the client may determine that the data has been successfully written into an entire blockchain system.

When receiving the response message returned by the slave node in the submission stage, the master node may collect and aggregate a digital signature of the slave node carried in each response message. By using the data structure shown in FIG. 5 as an example, the response message returned by the master node to the client carries the digital signature of the master node written in the field "pre-preparation stage signature" and the plurality of digital signatures of the slave nodes, and additionally carries the digital signature of the master node written in the field "preparation stage signature" and the plurality of digital signatures of the slave nodes, and the digital signature of the master node written in the field "submission stage signature" and the plurality of the digital signatures of the slave nodes. A quantity of digital signatures of the master nodes and the digital signatures of the slave nodes in the field "pre-preparation stage signature" should exceed ⅔ of the total quantity of nodes, a quantity of digital signatures of the master nodes and the digital signatures of the slave nodes in the field "preparation stage signature" also should exceed ⅔ of the total quantity of nodes, and a quantity of digital signatures of the master nodes and the digital signatures of the slave nodes in the field "submission stage signature" also should exceed ⅔ of the total quantity of nodes. In other words, a consensus condition of a high fault tolerance consensus algorithm in the pre-preparation stage, the preparation stage, and the submission stage is satisfied.

In a blockchain system in the related technology, one type of system pursues system performance and adopts a CFT-type consensus, such as Fabric; and the other type pursues wider fault tolerance and adopts a BFT-type consensus, such as Tendrmint. In an actual enterprise-level application, an upper-layer service system using a blockchain service continues to change with a user requirement, and has different demands in terms of performance, availability, fault tolerance, scalability, and the like. However, in a current blockchain system, a single consensus algorithm is used and a requirement of the upper-layer service system cannot be matched. An aspect of this disclosure provides a solution in which a CFT algorithm and a BFT algorithm are flexibly switched online, allowing the blockchain system to change, without stopping the service, the consensus algorithm to meet a requirement of a service system.

In an aspect of this disclosure, in a process of broadcasting the consensus request in the blockchain network, algorithm switching may be performed on some or all blockchain nodes in the blockchain network, to change consensus algorithms executed by the some or all blockchain nodes.

When some blockchain nodes complete algorithm switching and another part of the blockchain nodes do not complete algorithm switching, there are at least two blockchain nodes executing different consensus algorithms in the blockchain network. Based on this, consensus authentication may be performed by using the foregoing aspects of this disclosure.

In an aspect of this disclosure, the method of performing algorithm switching on some or all blockchain nodes in the blockchain network may include:
performing credibility prediction on the blockchain network, to determine whether an operating environment of the blockchain network is a trusted environment;
switching, in a case that the operating environment of the blockchain network is the trusted environment, some or all blockchain nodes in the blockchain network from executing a low fault tolerance consensus algorithm in the blockchain network to executing a high fault tolerance consensus algorithm; and switching, in a case that the operating environment of the blockchain network is a non-trusted environment, some or all blockchain nodes in the blockchain network from executing a high fault tolerance consensus algorithm in the blockchain network to executing a low fault tolerance consensus algorithm.

In an aspect of this disclosure, the method of performing credibility prediction on the blockchain network may include:

obtaining operating duration of each blockchain node in the blockchain network;

determining the blockchain node as a non-trusted node in a case that the operating duration is less than a duration threshold;

determining the operating environment of the blockchain network as the non-trusted environment in a case that a quantity of non-trusted nodes in the blockchain network is greater than a quantity threshold; and determining the operating environment of the blockchain network as the trusted environment in a case that the quantity of non-trusted nodes in the blockchain network is less than the quantity threshold.

For example, in a supply chain management scenario, the blockchain system is often initiated by an enterprise in a specified link in a supply chain process. In this case, the blockchain system may be considered to be in a trusted environment, there is no need to consider a case of a malicious node, and a simple CFT algorithm may be used as a consensus algorithm. When another enterprise in the supply chain join the blockchain system, to prevent the another enterprise from intentionally having malicious behavior, the steps of algorithm switching in this aspect of this disclosure may be performed to switch the consensus algorithm to a BFT algorithm. When the blockchain system has been running stably for a period of time and each participating enterprise may be considered a trusted node, the steps of algorithm switching in this aspect of this disclosure may be performed again to switch the consensus algorithm to the CFT algorithm to improve performance of the blockchain system.

Figure 9:
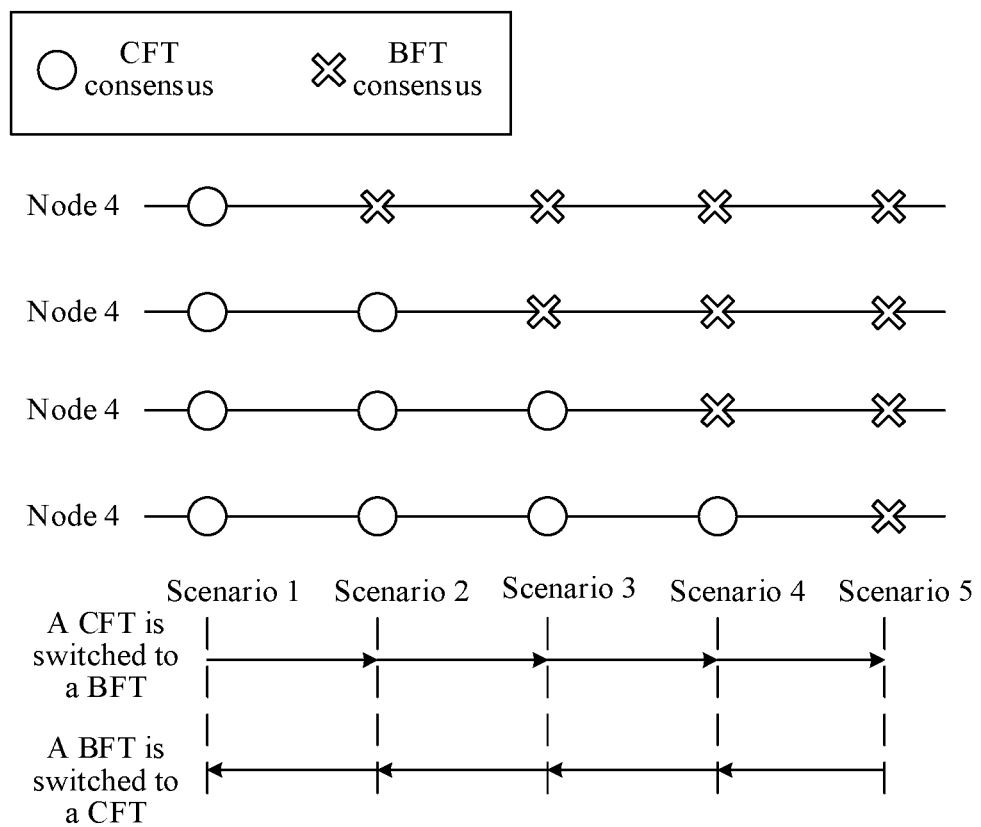
FIG. 9 shows a scenario example in a process of performing algorithm switching according to an aspect of this disclosure.

FIG. 9 shows a scenario example in a process of performing algorithm switching according to an aspect of this disclosure. By using algorithm switching of four nodes as an example, each blockchain node is to execute a different consensus algorithm at a different moment of algorithm switching.

When there are two consensus algorithms with different distribution ratios in a blockchain network, five scenarios shown in FIG. 8 may be formed. In a switch from a CFT consensus to a BFT consensus, the nodes are gradually switched from all CFT consensus algorithms to all BFT consensus algorithms. In other words, scenario 1 gradually changes to scenario 5. In a switch from the BFT consensus to the CFT consensus, the nodes are gradually switched from all BFT consensus algorithms to all CFT consensus algorithms. In other words, scenario 5 gradually changes to scenario 1.

Table 2 shows a ratio relationship of blockchain nodes executing different consensus algorithms to a total quantity of nodes in the five scenarios.

TABLE 2

| Scenario | Quantity ratio of CFT nodes to all nodes | Quantity ratio of BFT nodes to all nodes |
| --- | --- | --- |
| Scenario 1 | =1 | =0 |
| Scenario 2 | >½ | <½ |
| Scenario 3 | <½ and >⅓ | >½ and <⅔ |
| Scenario 4 | <⅓ | >⅔ |
| Scenario 5 | =0 | =1 |

The following describes consensus solutions in five application scenarios respectively.

Scenario 1:

In scenario 1, because a consensus algorithm of each node is CFT, this scenario is equivalent to a scenario of using a CFT algorithm alone. As long as all nodes follow a step of a local CFT algorithm, system data can be consistent.

Scenario 2:

In scenario 2, a consensus algorithm of only node 1 is a BFT algorithm, and consensus algorithms of the other three nodes are all CFT algorithms. In this case, a total quantity of CFT nodes (3) is greater than ½ of a total quantity of nodes (4). According to a consensus condition of the CFT algorithm, a consensus may be reached among the three CFT nodes. After the consensus is reached, node 1 synchronizes a consensus result to ensure that the system data is consistent.

Scenario 3:

In scenario 3, the quantity of CFT nodes cannot satisfy the consensus condition of being greater than ½ required by the CFT algorithm, and a quantity of BFT nodes cannot satisfy a consensus condition of being greater than ⅔ required by the BFT algorithm. In this case, according to the normal CFT algorithm or BFT algorithm, all nodes in the system cannot reach a consensus.

In this scenario, in this aspect of this disclosure, data interaction among the nodes may be performed by using a response message with the data structure shown in FIG. 5.

Refer to FIG. 5. The data structure includes three signature fields: a pre-preparation stage signature, a preparation stage signature, and a submission stage signature. A CFT consensus node uses the pre-preparation stage signature and the submission stage signature; and a BFT consensus node uses signatures of three stages.

Figure 10:
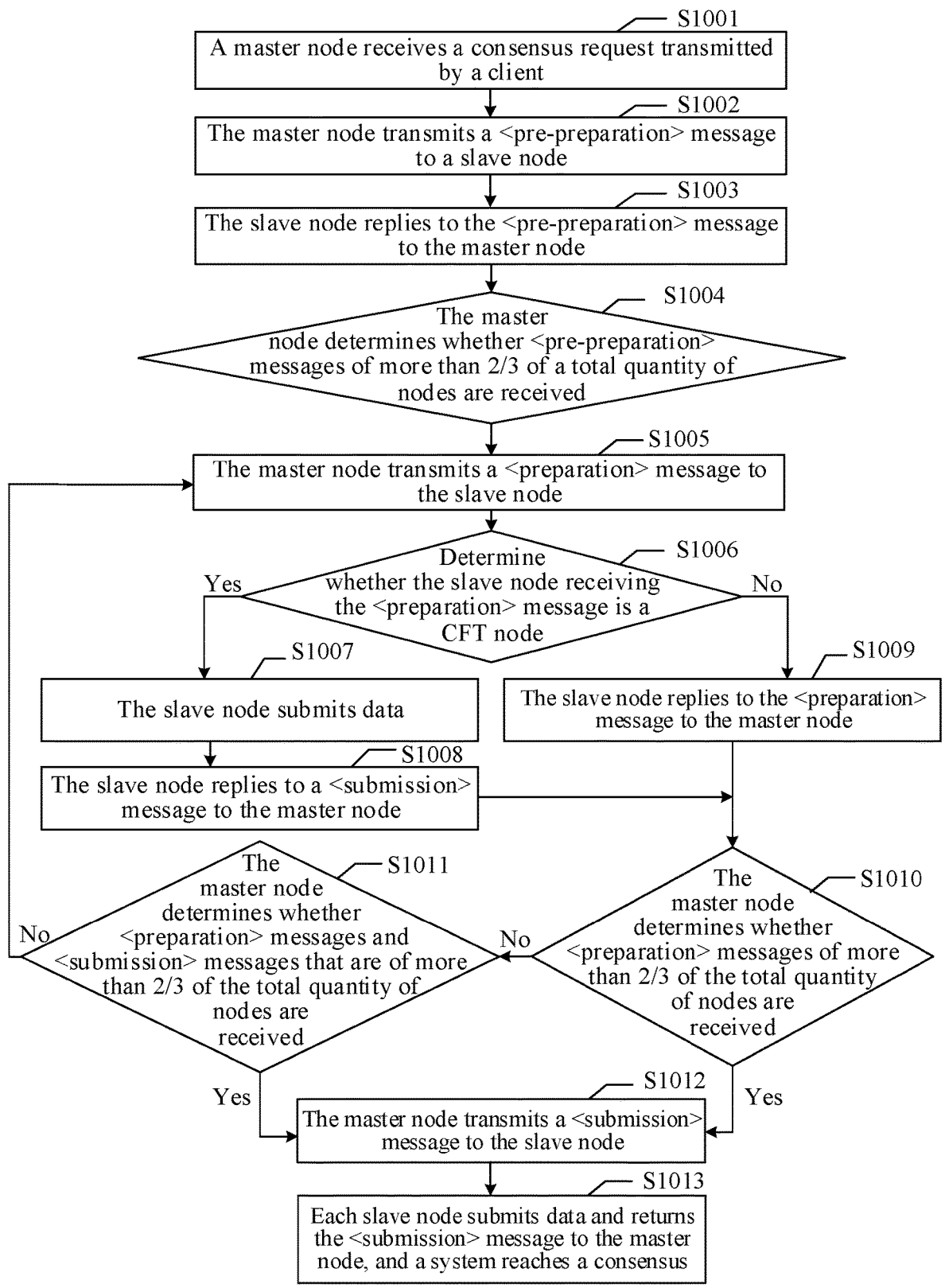
FIG. 10 is a flowchart of method steps of performing consensus authentication in an application scenario according to an aspect of this disclosure.

FIG. 10 is a flowchart of method steps of performing consensus authentication in an application scenario according to an aspect of this disclosure. As shown in FIG. 10, in the foregoing scenario 3, the method of performing consensus authentication may include the following steps.

S1001: A master node receives a consensus request transmitted by a client.

S1002: The master node transmits a <pre-preparation> message to a slave node.

S1003: The slave node replies to the <pre-preparation> message to the master node.

A preparation stage of a CFT consensus algorithm and a pre-preparation stage of a BFT consensus algorithm match each other. Therefore, a node using the CFT consensus algorithm may treat the <pre-preparation> message as a <preparation> message. In this case, both a slave node using a CFT consensus and a slave node using a BFT consensus reply to the <pre-preparation> message to the master node.

S1004: The master node determines whether <pre-preparation> messages of more than ⅔ of a total quantity of nodes are received.

If a quantity does not exceed ⅔, return to S1003 and the master node continues to receive a <pre-preparation> message replied by another slave node. If the quantity exceeds ⅔, consensus authentication in the pre-preparation stage is completed, the preparation stage is entered, and S1005 is performed.

S1005: The master node transmits a <preparation> message to the slave node.

S1006: Determine whether the slave node receiving the <preparation> message is a CFT node executing the CFT consensus algorithm. If a determining result is yes, step S1007 is performed. If a determining result is no, it indicates that the slave node is a BFT node executing the BFT consensus algorithm, and jump to S1010.

S1007: The slave node submits data.

When the slave node using the CFT consensus algorithm receives the <preparation> message from the master node, it may be said that the master node has received more than ⅔ of the <preparation> messages. This is greater than the condition of ½ required by the CFT algorithm, so that in this case, the slave node executing the CFT consensus algorithm may treat the <preparation> message as a <submission> message and directly submit the data. In this case, the node using the CFT consensus algorithm may reach a consensus, and the data is consistent.

S1008: The slave node replies to a <submission> message to the master node.

After completing submitting the data, the slave node executing the CFT consensus algorithm returns the <submission> message to the master node, so that another BFT node may achieve a submission condition that a total quantity of <preparation>+<submission> reaches ⅔. S1010 is then performed.

S1009: The slave node replies to the <preparation> message to the master node.

S1010: The master node determines whether <preparation> messages of more than ⅔ of the total quantity of nodes are received.

If it is determined that a quantity does not exceed ⅔, S1011 is continued to be performed. If it is determined that the quantity exceeds ⅔, consensus authentication in the preparation stage is completed, a submission stage is entered, and jump to perform S1012.

S1011: The master node determines whether <preparation> messages and <submission> messages that are of more than ⅔ of the total quantity of nodes are received.

The submission stage of the CFT consensus algorithm and the preparation stage and the submission stage that are of the BFT consensus algorithm match each other. Therefore, when the master node receives a <submission> message response replied by the CFT node, the master node may treat the <submission> message response as a <preparation> message response.

Based on this, if it is determined that the master node receives <preparation> messages and <submission> messages that are of more than ⅔ of the total quantity of nodes, consensus authentication in the preparation stage is completed, the submission stage is entered, and continue to perform S1012. If it is determined that the master node does not receive <preparation> messages and <submission> messages that are of more than ⅔ of the total quantity of nodes, return to S1005, and the master node continues to transmit the <preparation> message to another slave node.

S1012: The master node transmits a <submission> message to the slave node.

S1013: Each slave node submits data and returns the <submission> message to the master node, and a system reaches a consensus.

A node using the BFT consensus may achieve a <preparation> message response condition of being more than ⅔. In this case, the BFT consensus node may reach a consensus based on a step of the BFT algorithm, and consistency of the data with the CFT node may be ensured.

Scenario 4:

In scenario 4, node 4 executes the CFT consensus algorithm, and the other three nodes execute the BFT consensus algorithm. In this case, a total quantity of BFT nodes (3) is greater than ⅔ of the total quantity of nodes (4). According to the BFT consensus algorithm, a consensus may be reached among the three BFT nodes. After the consensus is reached, node 4 synchronizes a consensus result to ensure consistency of the system data.

Scenario 5:

In scenario 5, all nodes execute the BFT consensus algorithm. Based on a step of the BFT consensus algorithm, the system may reach a consistent consensus.

Based on the description of each application scenario above, it may be learned that the online consensus algorithm switching solution provided in this aspect of this disclosure may support switching the consensus algorithm without stopping a service, making the blockchain system more flexibly adapt to a requirement of an upper-layer service, and making the blockchain system more widely used in different scenarios.

Although the steps of the method in this disclosure are described in a specific order in the accompanying drawings, this does not require or imply that the steps have to be performed in the specific order, or all the steps shown have to be performed to achieve an expected result. Additionally or alternatively, some steps may be omitted, a plurality of steps may be combined into one step, and/or one step may be decomposed into a plurality of steps for execution, and the like.

Figure 11:
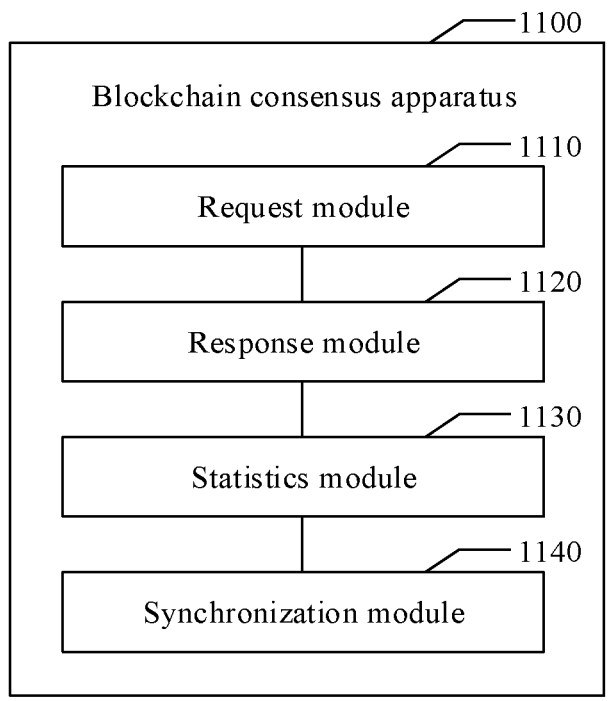
FIG. 11 is a schematic block diagram of a structure of a blockchain consensus apparatus according to an aspect of this disclosure.

The following describes apparatus aspects of this disclosure, and the apparatus aspects may be used for performing the blockchain consensus method in the foregoing aspect of this disclosure. FIG. 11 is a schematic block diagram of a structure of a blockchain consensus apparatus according to an aspect of this disclosure. As shown in FIG. 11, a blockchain consensus apparatus 1100 includes:

a request module 1110, configured to broadcast consensus requests corresponding to at least two consensus stages in a blockchain network, the blockchain network including at least two blockchain nodes executing consensus algorithms of different types;

a response module 1120, configured to separately obtain response messages broadcast by the blockchain network in the consensus stages, the response messages being messages from the blockchain nodes in response to the consensus requests, and the consensus algorithms of different types including a first consensus algorithm and a second consensus algorithm;

a statistics module 1130, configured to count a node quantity of blockchain nodes transmitting the response messages in a same consensus stage, the node quantity including a quantity of the at least two blockchain nodes executing the consensus algorithms of different types; and a synchronization module 1140, configured to: in a case that the node quantity satisfies a consensus condition of the first consensus algorithm, reach a consensus on a blockchain node executing the first consensus algorithm, and synchronize a consensus result of the first consensus algorithm with a blockchain node executing the second consensus algorithm.

In an aspect of this disclosure, based on the foregoing aspects, the consensus algorithms of different types include consensus stages of different quantities, each response message carries an algorithm type and a node signature that are of the blockchain node, the algorithm type indicates a consensus algorithm executed by the blockchain node, and the node signature includes a digital signature of the blockchain node in each consensus stage.

In an aspect of this disclosure, based on the foregoing aspects, the statistics module 1030 may further include:
 a parsing module, configured to parse each response message, to obtain the algorithm type and the node signature that are carried in the response message;
 an algorithm identification module, configured to identify, according to the algorithm type, a consensus algorithm executed by a message transmitting node, where the message transmitting node is the blockchain node transmitting the response message;
 a stage identification module, configured to identify a consensus stage of the message transmitting node according to the node signature; and
 a quantity statistics module, configured to count, according to the consensus algorithm executed by the message transmitting node and the consensus stage of the message transmitting node, a node quantity of message transmitting nodes being in a same consensus stage with a current blockchain node.

In an aspect of this disclosure, based on the foregoing aspects, the statistics module 1030 may further include:
 a relationship obtaining module, configured to obtain a matching relationship between consensus stages of the consensus algorithms of different types; and
 a node determination module, configured to determine, in a case that the message transmitting node and the current blockchain node execute consensus algorithms of different types, the message transmitting node being in the same consensus stage with the current blockchain node according to the matching relationship.

In an aspect of this disclosure, based on the foregoing aspects, the first consensus algorithm includes N consensus stages, and the second consensus algorithm includes M consensus stages; and the matching relationship between the consensus stages of the consensus algorithms of different types includes:
 first P consensus stages of the first consensus algorithm and first P consensus stages of the second consensus algorithm match each other, and P is a smaller value of N−1 and M−1; and
 last N−P consensus stages of the first consensus algorithm and last M−P consensus stages of the second consensus algorithm match each other.

In an aspect of this disclosure, based on the foregoing aspects, after counting the node quantity of the message transmitting nodes being in the same consensus stage with the current blockchain node, the statistics module 1030 may further include:
 a consensus result determination module, configured to determine, in a case that the consensus stage of the current blockchain node is a last consensus stage of an executed consensus algorithm, a consensus result of the consensus algorithm based on whether the node quantity satisfies a consensus condition of the executed consensus algorithm; and
 a consensus stage execution module, configured to determine, in a case that the consensus stage of the current blockchain node is not a last consensus stage of an executed consensus algorithm, based on whether the node quantity satisfies a consensus condition of the executed consensus algorithm, whether to execute a next consensus stage of the consensus algorithm.

In an aspect of this disclosure, based on the foregoing aspects, the first consensus algorithm is one of a low fault tolerance consensus algorithm and a high fault tolerance consensus algorithm, and the second consensus algorithm is one of the low fault tolerance consensus algorithm and the high fault tolerance consensus algorithm that is different from the first consensus algorithm; and
 a consensus condition of the low fault tolerance consensus algorithm is that a quantity ratio of the blockchain nodes transmitting the response messages to all blockchain nodes is greater than a first ratio threshold, a consensus condition of the high fault tolerance consensus algorithm is that the quantity ratio of the blockchain nodes transmitting the response messages to all blockchain nodes is greater than a second ratio threshold, and the first ratio threshold is less than the second ratio threshold.

In an aspect of this disclosure, based on the foregoing aspects, the low fault tolerance consensus algorithm includes consensus stages of a first quantity, the high fault tolerance consensus algorithm includes consensus stages of a second quantity, and the first quantity is less than the second quantity.

In an aspect of this disclosure, based on the foregoing aspects, each consensus stage of the low fault tolerance consensus algorithm includes a preparation stage and a submission stage that are executed in sequence, each consensus stage of the high fault tolerance consensus algorithm includes a pre-preparation stage, a preparation stage, and a submission stage that are executed in sequence, the preparation stage of the low fault tolerance consensus algorithm matches the pre-preparation stage of the high fault tolerance consensus algorithm, and the submission stage of the low fault tolerance consensus algorithm matches the preparation stage and the submission stage that are of the high fault tolerance consensus algorithm.

In an aspect of this disclosure, based on the foregoing aspects, the blockchain consensus apparatus 1000 may further include:
 an algorithm switching module, configured to perform algorithm switching on some or all blockchain nodes in the blockchain network, to change consensus algorithms executed by the some or all blockchain nodes.

In an aspect of this disclosure, based on the foregoing aspects, the algorithm switching module may further include:
 a credibility prediction module, configured to perform credibility prediction on the blockchain network, to determine whether an operating environment of the blockchain network is a trusted environment;
 a first algorithm switching module, configured to switch, in a case that the operating environment of the blockchain network is a trusted environment, some or all blockchain nodes in the blockchain network from executing a low fault tolerance consensus algorithm in the blockchain network to executing a high fault tolerance consensus algorithm; and a second algorithm switching module, configured to switch, in a case that the operating environment of the blockchain network is a non-trusted environment, some or all blockchain nodes in the blockchain network from executing a high fault tolerance consensus algorithm in the blockchain network to executing a low fault tolerance consensus algorithm.

In an aspect of this disclosure, based on the foregoing aspects, the credibility prediction module may further include:

a duration obtaining module, configured to obtain operating duration of each blockchain node in the blockchain network;

a non-trusted node determination module, configured to determine the blockchain node as a non-trusted node in a case that the operating duration is less than a duration threshold;

a non-trusted environment determination module, configured to determine the operating environment of the blockchain network as a non-trusted environment in a case that a quantity of non-trusted nodes in the blockchain network is greater than a quantity threshold; and a trusted environment determination module, configured to determine the operating environment of the blockchain network as a trusted environment in a case that the quantity of non-trusted nodes in the blockchain network is less than the quantity threshold.

Specific details of the blockchain consensus apparatus provided in the aspects of this disclosure have been described in detail in the corresponding method aspect. Details are not described herein again.

Figure 12:
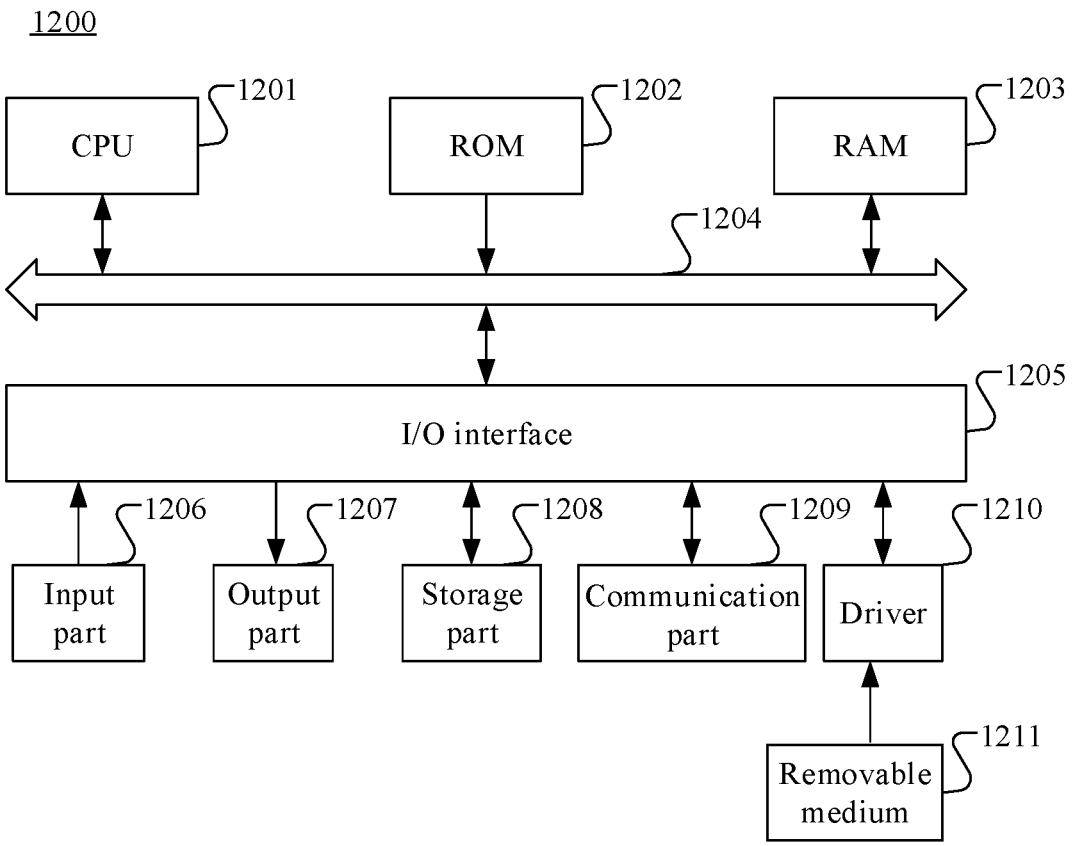
FIG. 12 is a schematic block diagram of a structure of a computer system of an electronic device adapted to implement an aspect of this disclosure.

FIG. 12 is a schematic block diagram of a structure of a computer system of an electronic device for implementing an aspect of this disclosure.

A computer system 1200 of the electronic device shown in FIG. 12 is merely an example, and does not constitute any limitation on functions and use ranges of the aspects of this disclosure.

As shown in FIG. 12, the computer system 1200 includes a central processing unit (CPU) 1201 (e.g., processing circuitry). The CPU 1201 may perform various appropriate actions and processing according to a program stored in a read-only memory (ROM) 1202 (e.g., non-transitory computer-readable storage medium) or a program loaded from a storage portion 1208 into a random access memory (RAM) 1203. The random access memory 1203 further stores various programs and data required for system operations. The central processing unit 1201, the read-only memory 1202, and the random access memory 1203 are connected to each other through a bus 1204. An input/output (I/O) interface 1205 is also connected to the bus 1204.

The following components are connected to the input/output interface 1205: an input part 1206 including a keyboard, a mouse, and the like; an output part 1207 including a cathode ray tube (CRT), a liquid crystal display (LCD), a loudspeaker, and the like; a storage part 1208 including hard disk, and the like; and a communication part 1209 including a network interface card such as an LAN card or a modem. The communication part 1209 performs communication processing by using a network such as the Internet. A driver 1210 is also connected to the input/output interface 1205 as required. A removable medium 1211, such as a magnetic disk, an optical disc, a magneto-optical disk, or a semiconductor memory, is mounted on the driver 1210 as required, so that a computer program read from the removable medium is installed into the storage part 1208 as required.

Particularly, according to an aspect of this disclosure, the processes described in the foregoing may be implemented as computer software programs. For example, an aspect of this disclosure includes a computer program product, the computer program product includes a computer program carried on a computer-readable medium, and the computer program includes program code used for performing the methods shown in the flowcharts. In such an aspect, the computer program may be downloaded and installed from a network through the communication part 1209, and/or installed from the removable medium 1211. When the computer program is executed by the central processing unit 1201, the various functions defined in the system of this disclosure are executed.

The computer-readable medium shown in the aspects of this disclosure may be a computer-readable signal medium or a non-transitory computer-readable storage medium or any combination thereof. The computer-readable storage medium may be, for example, but is not limited to, an electric, magnetic, optical, electromagnetic, infrared, or semi-conductive system, apparatus, or device, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this disclosure, the computer-readable storage medium may be any tangible medium including or storing a program, and the program may be used by or in combination with an instruction execution system, apparatus, or device. In this disclosure, the computer-readable signal medium may include a data signal being in a baseband or propagated as at least a part of a carrier wave, and carries computer-readable program code. The propagated data signal may be in a plurality of forms, including, but not limited to, an electromagnetic signal, an optical signal, or any appropriate combination thereof. The computer-readable signal medium may alternatively be any computer-readable medium other than the computer-readable medium. The computer-readable medium may send, propagate or transmit a program that is used by or used in combination with an instruction execution system, apparatus or device. The program code included in the computer-readable medium may be transmitted by using any suitable medium, including but not limited to: a wireless medium, a wired medium, or the like, or any suitable combination thereof.

The flowcharts and block diagrams in the accompanying drawings illustrate possible system architectures, functions, and operations that may be implemented by a system, a method, and a computer program product according to various aspects of this disclosure. In this regard, each box in the flowchart or the block diagram may represent a module, a program segment, or a part of code. The module, the program segment, or the part of code includes one or more executable instructions used for implementing specified logic functions. In some implementations used as substitutes, functions marked in boxes may alternatively occur in a sequence different from that marked in an accompanying drawing. For example, two boxes shown in succession may actually be performed basically in parallel, and sometimes the two boxes may be performed in a reverse sequence. This is determined by a related function. Each block in the block diagram or the flowchart, and a combination of blocks in the block diagram or the flowchart may be implemented by using a dedicated hardware-based system that performs a specified function or operation, or may be implemented by using a combination of dedicated hardware and computer instructions.

Although several modules or units of a device for action execution are mentioned in the foregoing detailed descriptions, the division is not mandatory. Actually, according to the implementations of this disclosure, the features and functions of two or more modules or units described above may be specified in one module or unit. Conversely, the features and functions of one module or unit described above may be further divided into a plurality of modules or units to be embodied.

Through the description of the foregoing aspects, a person skilled in the art can easily understand that the exemplary implementations described herein may be implemented by software, or may be implemented by combining software with necessary hardware. Therefore, the technical solutions of the aspects of this disclosure may be implemented in a form of a software product. The software product may be stored in a non-volatile storage medium (which may be a CD-ROM, a USB flash drive, a removable hard disk, or the like) or on a network, including several instructions for instructing a computing device (which may be a PC, a server, a touch terminal, a network device, or the like) to perform the methods according to the aspects of this disclosure.

Other implementation solutions of this disclosure will be apparent to a person skilled in the art from consideration of the specification and practice of the disclosure here. This disclosure is intended to cover any variation, use, or adaptive change of this disclosure. These variations, uses, or adaptive changes follow the general principles of this disclosure and include common general knowledge or common technical means in the art that are not disclosed in this disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A blockchain consensus method, performed by a current blockchain node in a blockchain network, the blockchain consensus method comprising:
    broadcasting consensus requests to a plurality of blockchain nodes executing consensus algorithms of different fault tolerance types in the blockchain network, the consensus algorithms of the different fault tolerance types comprising a first consensus algorithm and a second consensus algorithm, the plurality of blockchain nodes including first blockchain nodes executing the first consensus algorithm and second blockchain nodes executing the second consensus algorithm;
    obtaining response messages from respective blockchain nodes of the plurality of blockchain nodes in the blockchain network in response to the consensus requests;
    counting a first node quantity of the blockchain nodes transmitting the response messages in a same consensus stage, the first node quantity comprising a quantity of the blockchain nodes in the plurality of blockchain nodes executing the consensus algorithms of the different fault tolerance types; and
    when the first node quantity satisfies a consensus condition of the first consensus algorithm,
        broadcasting second consensus requests to the plurality of blockchain nodes,
        reaching a consensus on the first blockchain nodes executing the first consensus algorithm when one or more of the first blockchain nodes submit data and transmit respective second response messages in response to the second consensus requests, and not reaching a consensus on the second blockchain nodes executing the second consensus algorithm when one or more of the second blockchain nodes transmit respective second response messages in response to the second consensus requests, and
        synchronizing a consensus result of the first consensus algorithm with the second blockchain nodes executing the second consensus algorithm, the synchronizing the consensus result including:
            counting a second node quantity of (i) the one or more of the first blockchain nodes executing the first consensus algorithm and (ii) the one or more of the second blockchain nodes executing the second consensus algorithm, and
            when the second node quantity satisfies a consensus condition of the second consensus algorithm, reaching a consensus on the second blockchain nodes executing the second consensus algorithm.

2. The blockchain consensus method according to claim 1, wherein the consensus algorithms of the different fault tolerance types comprise consensus stages of different quantities, each response message includes an algorithm type and a node signature that correspond to a blockchain node, the algorithm type indicates a consensus algorithm executed by the blockchain node, and the node signature comprises a digital signature of the blockchain node in each consensus stage.

3. The blockchain consensus method according to claim 2, wherein the counting the first node quantity comprises:
    parsing each response message, to obtain the algorithm type and the node signature that are included in the respective response message;
    identifying, according to the algorithm type, a consensus algorithm executed by a message transmitting node that is a blockchain node transmitting the respective response message;
    identifying a consensus stage of the message transmitting node according to the node signature; and
    counting, according to the consensus algorithm executed by the message transmitting node and the consensus stage of the message transmitting node, a node quantity of message transmitting nodes that are in a same consensus stage with the current blockchain node.

4. The blockchain consensus method according to claim 3, wherein the blockchain consensus method further comprises:

obtaining a matching relationship between the consensus stages of the consensus algorithms of the different fault tolerance types; and determining, when the message transmitting node and the current blockchain node execute the consensus algorithms of the different fault tolerance types, whether the message transmitting node is in the same consensus stage with the current blockchain node according to the matching relationship.

5. The blockchain consensus method according to claim 4, wherein
the first consensus algorithm comprises N consensus stages, and the second consensus algorithm comprises M consensus stages; and
the matching relationship between the consensus stages of the consensus algorithms of the different fault tolerance types comprises:
first P consensus stages of the first consensus algorithm and first P consensus stages of the second consensus algorithm match each other, and P is a smaller value of N−1 and M−1; and
last N−P consensus stages of the first consensus algorithm and last M−P consensus stages of the second consensus algorithm match each other.

6. The blockchain consensus method according to claim 3, wherein the blockchain consensus method further comprises:
determining, when the consensus stage of the current blockchain node is a last consensus stage of an executed consensus algorithm, a consensus result of the consensus algorithm based on whether the first node quantity satisfies a consensus condition of the executed consensus algorithm; and
determining, when the consensus stage of the current blockchain node is not a last consensus stage of an executed consensus algorithm, whether to execute a next consensus stage of the consensus algorithm based on whether the first node quantity satisfies the consensus condition of the executed consensus algorithm.

7. The blockchain consensus method according to claim 1, wherein
the first consensus algorithm is one of a low fault tolerance consensus algorithm and a high fault tolerance consensus algorithm, and the second consensus algorithm is another one of the low fault tolerance consensus algorithm and the high fault tolerance consensus algorithm; and
a consensus condition of the low fault tolerance consensus algorithm is that a quantity ratio of blockchain nodes transmitting the response messages to all blockchain nodes is greater than a first ratio threshold, a consensus condition of the high fault tolerance consensus algorithm is that the quantity ratio of the blockchain nodes transmitting the response messages to all the blockchain nodes is greater than a second ratio threshold, and the first ratio threshold is less than the second ratio threshold.

8. The blockchain consensus method according to claim 7, wherein the low fault tolerance consensus algorithm comprises consensus stages of a first quantity, the high fault tolerance consensus algorithm comprises consensus stages of a second quantity, and the first quantity is less than the second quantity.

9. The blockchain consensus method according to claim 8, wherein the low fault tolerance consensus algorithm comprises a preparation stage and a submission stage that are executed in sequence, the high fault tolerance consensus algorithm comprises a pre-preparation stage, a preparation stage, and a submission stage that are executed in sequence, the preparation stage of the low fault tolerance consensus algorithm matches the pre-preparation stage of the high fault tolerance consensus algorithm, and the submission stage of the low fault tolerance consensus algorithm matches the preparation stage and the submission stage that are of the high fault tolerance consensus algorithm.

10. The blockchain consensus method according to claim 1, wherein the broadcasting the consensus requests comprises:
performing algorithm switching on some or all blockchain nodes in the blockchain network, to change consensus algorithms executed by the some or all blockchain nodes.

11. The blockchain consensus method according to claim 10, wherein the performing the algorithm switching comprises:
performing credibility prediction on the blockchain network, to determine whether an operating environment of the blockchain network is a trusted environment;
switching, when the operating environment of the blockchain network is a trusted environment, the some or all blockchain nodes in the blockchain network from executing a low fault tolerance consensus algorithm in the blockchain network to executing a high fault tolerance consensus algorithm; and
switching, when the operating environment of the blockchain network is a non-trusted environment, the some or all blockchain nodes in the blockchain network from executing the high fault tolerance consensus algorithm in the blockchain network to executing the low fault tolerance consensus algorithm.

12. The blockchain consensus method according to claim 11, wherein the performing the credibility prediction on the blockchain network comprises:
obtaining operating duration of each blockchain node in the blockchain network;
determining a respective blockchain node as a non-trusted node when the operating duration of the respective blockchain node is less than a duration threshold;
determining the operating environment of the blockchain network as the non-trusted environment when a quantity of non-trusted nodes in the blockchain network is greater than a quantity threshold; and
determining the operating environment of the blockchain network as the trusted environment when the quantity of non-trusted nodes in the blockchain network is less than the quantity threshold.

13. A blockchain consensus apparatus, comprising:
processing circuitry configured to
broadcast consensus requests to a plurality of blockchain nodes executing consensus algorithms of different fault tolerance types in a blockchain network, the consensus algorithms of the different fault tolerance types comprising a first consensus algorithm and a second consensus algorithm, the plurality of blockchain nodes including first blockchain nodes executing the first consensus algorithm and second blockchain nodes executing the second consensus algorithm;
obtain response messages from respective blockchain nodes of the plurality of blockchain nodes in the blockchain network in response to the consensus requests;
count a first node quantity of the blockchain nodes transmitting the response messages in a same consensus stage, the first node quantity comprising a quantity of the blockchain nodes in the plurality of blockchain nodes executing the consensus algorithms of the different fault tolerance types; and when the first node quantity satisfies a consensus condition of the first consensus algorithm, broadcast second consensus requests to the plurality of blockchain nodes, reach a consensus on the first blockchain nodes executing the first consensus algorithm when one or more of the first blockchain nodes submit data and transmit respective second response messages in response to the second consensus requests, and not reach a consensus on the second blockchain nodes executing the second consensus algorithm when one or more of the second blockchain nodes transmit respective second response messages in response to the second consensus requests, and synchronize a consensus result of the first consensus algorithm with the second blockchain nodes executing the second consensus algorithm, a second node quantity of (i) the one or more of the first blockchain nodes executing the first consensus algorithm and (ii) the one or more of the second blockchain nodes executing the second consensus algorithm being counted, and a consensus on the second blockchain nodes executing the second consensus algorithm being reached when the second node quantity satisfies a consensus condition of the second consensus algorithm.

14. The blockchain consensus apparatus according to claim 13, wherein the consensus algorithms of the different fault tolerance types comprise consensus stages of different quantities, each response message includes an algorithm type and a node signature that correspond to a blockchain node, the algorithm type indicates a consensus algorithm executed by the blockchain node, and the node signature comprises a digital signature of the blockchain node in each consensus stage.

15. The blockchain consensus apparatus according to claim 14, wherein the processing circuitry is further configured to:

parse each response message, to obtain the algorithm type and the node signature that are included in the respective response message;

identify, according to the algorithm type, a consensus algorithm executed by a message transmitting node that is a blockchain node transmitting the respective response message;

identify a consensus stage of the message transmitting node according to the node signature; and count, according to the consensus algorithm executed by the message transmitting node and the consensus stage of the message transmitting node, a node quantity of message transmitting nodes that are in a same consensus stage with a current blockchain node.

16. The blockchain consensus apparatus according to claim 15, wherein the processing circuitry is further configured to:

obtain a matching relationship between consensus stages of the consensus algorithms of the different fault tolerance types; and determine, when the message transmitting node and the current blockchain node execute the consensus algorithms of the different fault tolerance types, whether the message transmitting node is in the same consensus stage with the current blockchain node according to the matching relationship.

17. The blockchain consensus apparatus according to claim 16, wherein the first consensus algorithm comprises N consensus stages, and the second consensus algorithm comprises M consensus stages; and the matching relationship between the consensus stages of the consensus algorithms of the different fault tolerance types comprises:

first P consensus stages of the first consensus algorithm and first P consensus stages of the second consensus algorithm match each other, and P is a smaller value of N−1 and M−1; and last N−P consensus stages of the first consensus algorithm and last M−P consensus stages of the second consensus algorithm match each other.

18. The blockchain consensus apparatus according to claim 15, wherein the processing circuitry is further configured to:

determine, when the consensus stage of the current blockchain node is a last consensus stage of an executed consensus algorithm, a consensus result of the consensus algorithm based on whether the first node quantity satisfies a consensus condition of the executed consensus algorithm; and determine, when the consensus stage of the current blockchain node is not a last consensus stage of an executed consensus algorithm, whether to execute a next consensus stage of the consensus algorithm based on whether the first node quantity satisfies the consensus condition of the executed consensus algorithm.

19. The blockchain consensus apparatus according to claim 13, wherein the first consensus algorithm is one of a low fault tolerance consensus algorithm and a high fault tolerance consensus algorithm, and the second consensus algorithm is another one of the low fault tolerance consensus algorithm and the high fault tolerance consensus algorithm; and a consensus condition of the low fault tolerance consensus algorithm is that a quantity ratio of blockchain nodes transmitting the response messages to all blockchain nodes is greater than a first ratio threshold, a consensus condition of the high fault tolerance consensus algorithm is that the quantity ratio of the blockchain nodes transmitting the response messages to all the blockchain nodes is greater than a second ratio threshold, and the first ratio threshold is less than the second ratio threshold.

20. A non-transitory computer-readable storage medium storing computer-readable instructions thereon, which, when executed by processing circuitry, cause the processing circuitry to perform a blockchain consensus method comprising:

broadcasting consensus requests to a plurality of blockchain nodes executing consensus algorithms of different fault tolerance types in a blockchain network, the consensus algorithms of the different fault tolerance types comprising a first consensus algorithm and a second consensus algorithm, the plurality of blockchain nodes including first blockchain nodes executing the first consensus algorithm and second blockchain nodes executing the second consensus algorithm;

obtaining response messages from respective blockchain nodes of the plurality of blockchain nodes in the blockchain network in response to the consensus requests;

counting a first node quantity of the blockchain nodes transmitting the response messages in a same consensus stage, the first node quantity comprising a quantity of the blockchain nodes in the plurality of blockchain nodes executing the consensus algorithms of the different fault tolerance types; and when the first node quantity satisfies a consensus condition of the first consensus algorithm,
- broadcasting second consensus requests to the plurality of blockchain nodes,
- reaching a consensus on the first blockchain nodes executing the first consensus algorithm when one or more of the first blockchain nodes submit data and transmit respective second response messages in response to the second consensus requests, and not reaching a consensus on the second blockchain nodes executing the second consensus algorithm when one or more of the second blockchain nodes transmit respective second response messages in response to the second consensus requests, and
- synchronizing a consensus result of the first consensus algorithm with the second blockchain nodes executing the second consensus algorithm, the synchronizing the consensus result including:
  - counting a second node quantity of (i) the one or more of the first blockchain nodes executing the first consensus algorithm and (ii) the one or more of the second blockchain nodes executing the second consensus algorithm, and
  - when the second node quantity satisfies a consensus condition of the second consensus algorithm, reaching a consensus on the second blockchain nodes executing the second consensus algorithm.

* * * * *